(12) United States Patent
Murase

(10) Patent No.: US 11,766,755 B2
(45) Date of Patent: Sep. 26, 2023

(54) WORKPIECE CONVEYANCE SYSTEM AND MACHINE TOOL SYSTEM

(71) Applicant: Murata Machinery, Ltd., Kyoto (JP)

(72) Inventor: Nobuhiro Murase, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 970 days.

(21) Appl. No.: 16/603,321

(22) PCT Filed: Mar. 12, 2018

(86) PCT No.: PCT/JP2018/009445
§ 371 (c)(1),
(2) Date: Oct. 7, 2019

(87) PCT Pub. No.: WO2018/190052
PCT Pub. Date: Oct. 18, 2018

(65) Prior Publication Data
US 2020/0055153 A1    Feb. 20, 2020

(30) Foreign Application Priority Data

Apr. 11, 2017  (JP) ................................. 2017-078246

(51) Int. Cl.
*B23Q 7/04*       (2006.01)
*B23B 3/30*       (2006.01)
(Continued)

(52) U.S. Cl.
CPC ................ *B23Q 7/046* (2013.01); *B23B 3/08* (2013.01); *B23B 3/30* (2013.01); *B23Q 7/14* (2013.01); *B23Q 41/02* (2013.01)

(58) Field of Classification Search
CPC .. B23B 3/08; B23B 3/30; B23B 13/04; B23B 13/10; B23Q 7/046; B23Q 7/14;
(Continued)

(56) References Cited

U.S. PATENT DOCUMENTS

2017/0282322 A1    10/2017  Mori
2023/0001528 A1*   1/2023   Tanio ..................... B23Q 7/046

FOREIGN PATENT DOCUMENTS

JP    S58-206303 A    12/1983
JP    63-237834 A     10/1988
(Continued)

OTHER PUBLICATIONS

The Extended European Search Report dated Nov. 30, 2020, of counterpart European Application No. 18785227.2.

*Primary Examiner* — Sara Addisu
(74) *Attorney, Agent, or Firm* — DLA Piper LLP (US)

(57) ABSTRACT

It is possible to improve workpiece machining efficiency by efficiently receiving and delivering a workpiece from/to each workpiece holder and shortening a time required for workpiece conveyance. A workpiece conveyance system is a workpiece conveyance system that receives and delivers workpieces W to be machined to n spindles (workpiece holders, where n is an integer satisfying n≥2) that hold and rotate the workpieces W, and includes a main loader including n+m main loader chucks (where m is an integer satisfying m≥1) that receive and deliver workpieces from/to the n spindles or n relay loaders disposed corresponding to the n respective spindles to receive and deliver the workpieces W from/to the main shafts.

18 Claims, 31 Drawing Sheets

(51) Int. Cl.
*B23B 15/00* (2006.01)
*B23B 3/08* (2006.01)
*B23Q 7/14* (2006.01)
*B23Q 41/02* (2006.01)

(58) Field of Classification Search
CPC .. B23Q 41/02; B23Q 7/048; B23Q 2707/003; B23Q 7/00; B23Q 7/04
See application file for complete search history.

(56) References Cited

FOREIGN PATENT DOCUMENTS

| | | | |
|---|---|---|---|
| JP | 01-234134 A | | 9/1989 |
| JP | 03-52046 U | | 5/1991 |
| JP | 05-84635 A | | 4/1993 |
| JP | 10-15770 A | | 1/1998 |
| JP | 10080837 A | * | 3/1998 |
| JP | 3474060 B2 | | 9/2003 |
| JP | 2009012154 A | * | 1/2009 |
| WO | 2016/047288 A1 | | 3/2016 |
| WO | 2017/010729 A1 | | 1/2017 |

* cited by examiner

FIG. 3
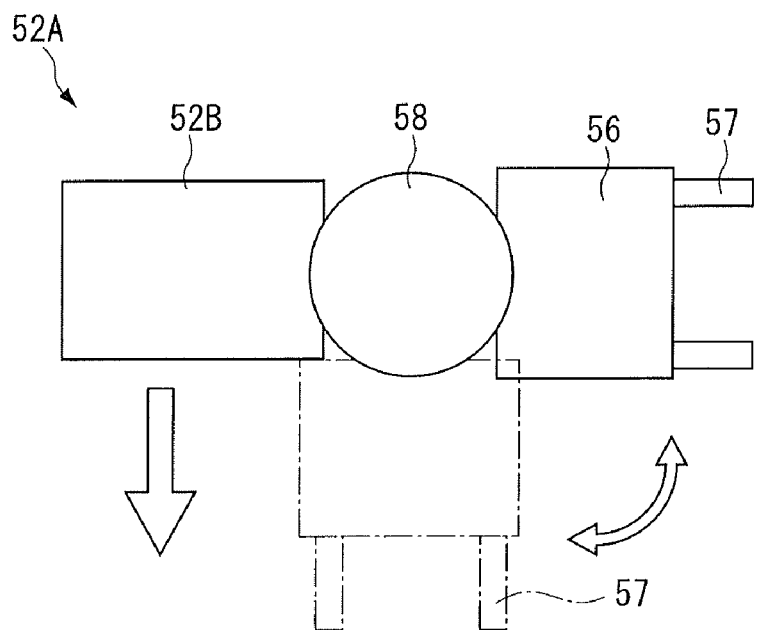
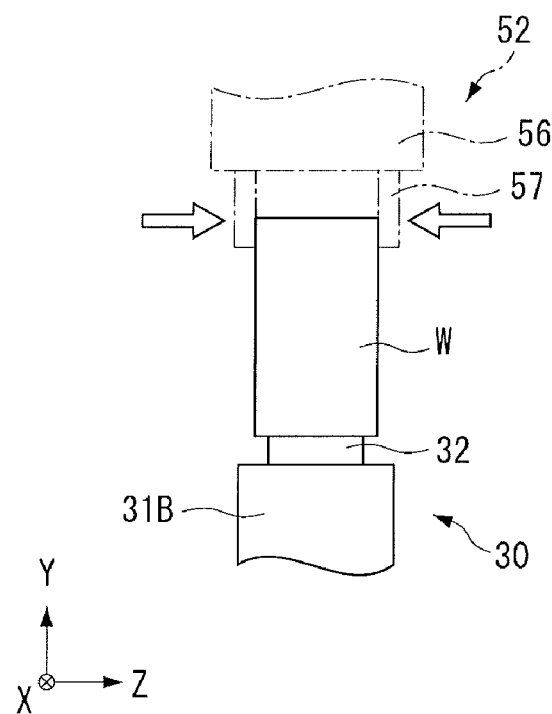

WORKPIECE CONVEYANCE SYSTEM AND MACHINE TOOL SYSTEM

TECHNICAL FIELD

This disclosure relates to a workpiece conveyance system and a machine tool system.

BACKGROUND

A machine tool such as a lathe includes a workpiece conveyance device that receives and delivers workpieces from/to a plurality of spindles (workpiece holders) that hold and rotate workpieces to be machined. As an example of the workpiece conveyance device, a configuration having main loaders and relay loaders, the main loaders moving along a rail disposed on a machine tool body and receiving and delivering workpieces from/to spindles of the machine tool body and the relay loaders receiving and delivering the workpieces from/to the main loaders and receiving and delivering the workpieces from/to a workpiece supply stand or a workpiece discharge stand, is known (for example, see Japanese Patent Registration No. 3474060).

In the aforementioned workpiece conveyance device, since receiving and delivery of the workpiece between the main loader and the relay loader is performed by switching between a chuck receiving the workpiece and a chuck delivering the workpiece, there is a problem in that it takes time to switch between the chucks, and a time required to convey the workpiece becomes long. Furthermore, for example, when there are a plurality of spindles like a parallel double spindle lathe or the like, if one main loader receives and delivers a workpiece from/to each spindle, a time required for workpiece conveyance becomes long, and workpiece machining efficiency is reduced. Therefore, it is desired to efficiently convey the workpiece when there are a plurality of spindles.

In view of the foregoing, it could be helpful to provide a workpiece conveyance system and a machine tool system by which, even when there are a plurality of workpiece holders such as spindles, it is possible to improve workpiece machining efficiency by efficiently receiving and delivering a workpiece from/to each workpiece holder and shortening a time required for workpiece conveyance.

SUMMARY

We thus provide:

A workpiece conveyance system that receives and delivers workpieces from/to n workpiece holders (where n is an integer satisfying n≥2) that hold and rotate workpieces to be machined, includes a main loader including n+m main loader chucks (where m is an integer satisfying m≥1) that receive and deliver the workpieces from/to the n workpiece holders or n relay loaders disposed corresponding to the n respective workpiece holders to receive and deliver the workpieces from/to the workpiece holders.

The workpiece conveyance system may include a controller that, when the n main loader chucks hold unmachined workpieces and the m main loader chucks are in an empty state in relation to one of the n workpiece holders, allows the main loader chucks in the empty state to receive a machined workpiece from the one of the workpiece holders and allows the main loader chucks holding the unmachined workpieces to supply the unmachined workpiece to the one of the workpiece holders, and in relation to one of next workpiece holders, allows the main loader chucks previously in the empty state to receive a machined workpiece from the one of the next workpiece holders and allows the main loader chucks holding the unmachined workpieces to supply the unmachined workpiece to the one of the next workpiece holders, the controller receiving the machined workpiece and supplying the unmachined workpiece from/to the one of the workpiece holders repeatedly n times.

The relay loaders may each include a relay loader chuck that receives and delivers the workpiece from/to the corresponding workpiece holder, and in the main loader, the main loader chucks may move to a position corresponding to the relay loader chuck and receive and deliver the workpiece from/to the relay loader chuck.

One of the relay loaders may have disposed thereon a plurality of the relay loader chucks.

The n+m main loader chucks may be disposed in one direction at a predetermined interval, the relay loader chucks may be disposed at the same interval as that between the main loader chucks, and the relay loader chucks may be disposed in parallel with the one direction with the movement of the relay loaders.

The workpiece conveyance system may include a controller that performs, in one operation, an operation of delivering the workpieces from the relay loader chucks to the main loader chucks and an operation of delivering the workpieces from the main loader chucks to the relay loader chucks.

The main loader is movable in a direction that is a horizontal direction and orthogonal to a direction of a rotation axis of the workpiece holders, and the relay loaders are able to turn in a direction around an axis parallel with the rotation axis of the workpiece holders, and may be configured to turn between a first position where any one of the relay loader chucks faces the workpiece holder and a second position where the relay loader chucks can face the n+m main loader chucks.

The relay loader chucks and the main loader chucks may be configured to hold the workpieces toward a direction parallel with the rotation axis of the workpiece holders.

The main loader chucks may be switched between a state of holding a workpiece toward a direction parallel with the rotation axis of the corresponding workpiece holder and a state of holding a workpiece in a downward direction.

A machine tool system includes a machine tool body including a plurality of workpiece holders that hold and rotate workpieces to be machined, a carrying-in part that holds an unmachined workpiece, a carrying-out part that holds a machined workpiece, and the workpiece conveyance system that conveys a workpiece between the workpiece holders and the carrying-in part, or between the workpiece holders and the carrying-out part, or both.

According to the workpiece conveyance system and the machine tool system, since the n+m main loader chucks are provided for the n workpiece holders, the main loader does not need to repeat movement between the workpiece holder and the carrying-in part and between the workpiece holder and the carrying-out part for each workpiece holder, and since the main loader can receive and deliver workpieces from/to the n workpiece holders in a short period of time, the efficiency in conveying workpieces is improved, and thus it is possible to improve workpiece machining efficiency.

When the aforementioned controller is provided, receiving of a machined workpiece and supplying of an unmachined workpiece from/to one of the workpiece holders can be efficiently performed by the controller.

When the workpiece conveyance system has the relay loader including the relay loader chucks disposed corresponding to the n respective workpiece holders to receive and deliver workpieces from/to the workpiece holders, and the main loader chuck moves to a position corresponding to the relay loader chuck and receives and delivers a workpiece from/to the relay loader chuck, since the main loader can move toward another workpiece holder while the relay loader delivers and receives a workpiece from/to the workpiece holder, and the time during which the main loader stops is shortened, the efficiency in conveying workpieces can be improved.

When one of relay loaders has disposed thereon a plurality of the relay loader chucks, a plurality of workpieces can be simultaneously received and delivered between the plurality of relay loader chucks of such a relay loader and the n+m main loader chucks of the main loader. For example, while a machined workpiece held by one of the relay loader chucks is delivered to one of the main loader chucks, an unmachined workpiece held by another one of the main loader chucks can be received by another one of the relay loader chucks. As described above, since a plurality of workpieces can be simultaneously received and delivered, a time required for receiving and delivering the workpieces can be shortened, and efficiency in conveying the workpieces can be improved.

When the n+m main loader chucks are disposed in one direction at a predetermined interval, the relay loader chucks are disposed at the same interval as that among the main loader chucks, and the relay loader chucks can be disposed in parallel with the one direction with the movement of the relay loaders, the relay loader chucks and the n+m main loader chucks can be allowed to easily face each other and a plurality of workpieces can be easily received and delivered.

When the workpiece conveyance system includes a controller that performs, in one operation, an operation of delivering the workpieces from the relay loader chucks to the main loader chucks and an operation of delivering the workpieces from the main loader chucks to the relay loader chucks, the relay loader and the main loader can be easily operated by the controller.

When the main loader is movable in a direction that is a horizontal direction and is orthogonal to a direction of a rotation axis of the workpiece holders, and the relay loaders are able to turn in a direction around an axis parallel with the rotation axis of the workpiece holders, and turn between a first position where any one of the relay loader chucks faces the workpiece holder and a second position where the relay loader chucks can face the n+m main loader chucks, the main loader can efficiently move to the workpiece holders and the relay loader turns between the first position and the second position so that the relay loader chuck can be allowed to easily face the workpiece holder or the main loader chuck.

When the relay loader chuck and the main loader chuck hold workpieces toward a direction parallel with the rotation axis of the workpiece holders, when the relay loader chuck receives and delivers a workpiece from/to the workpiece holder or the main loader chuck, it is possible to shorten a time required for receiving and delivering the workpiece because it is not necessary to change the orientation of the relay loader chuck or the main loader chuck.

When the main loader chucks can be switched between a state of holding a workpiece toward a direction parallel with the rotation axis of the corresponding workpiece holder and a state of holding a workpiece in a downward direction, even though the workpiece is placed in an upward direction, it is possible to hold the workpiece by switching the orientation of the main loader chuck and it is possible to ensure the general usability of the orientation in which the workpiece is placed.

BRIEF DESCRIPTION OF THE DRAWINGS

FIG. 3 is a diagram illustrating another example of a main loader.

DESCRIPTION OF REFERENCE SIGNS

Figure 1:
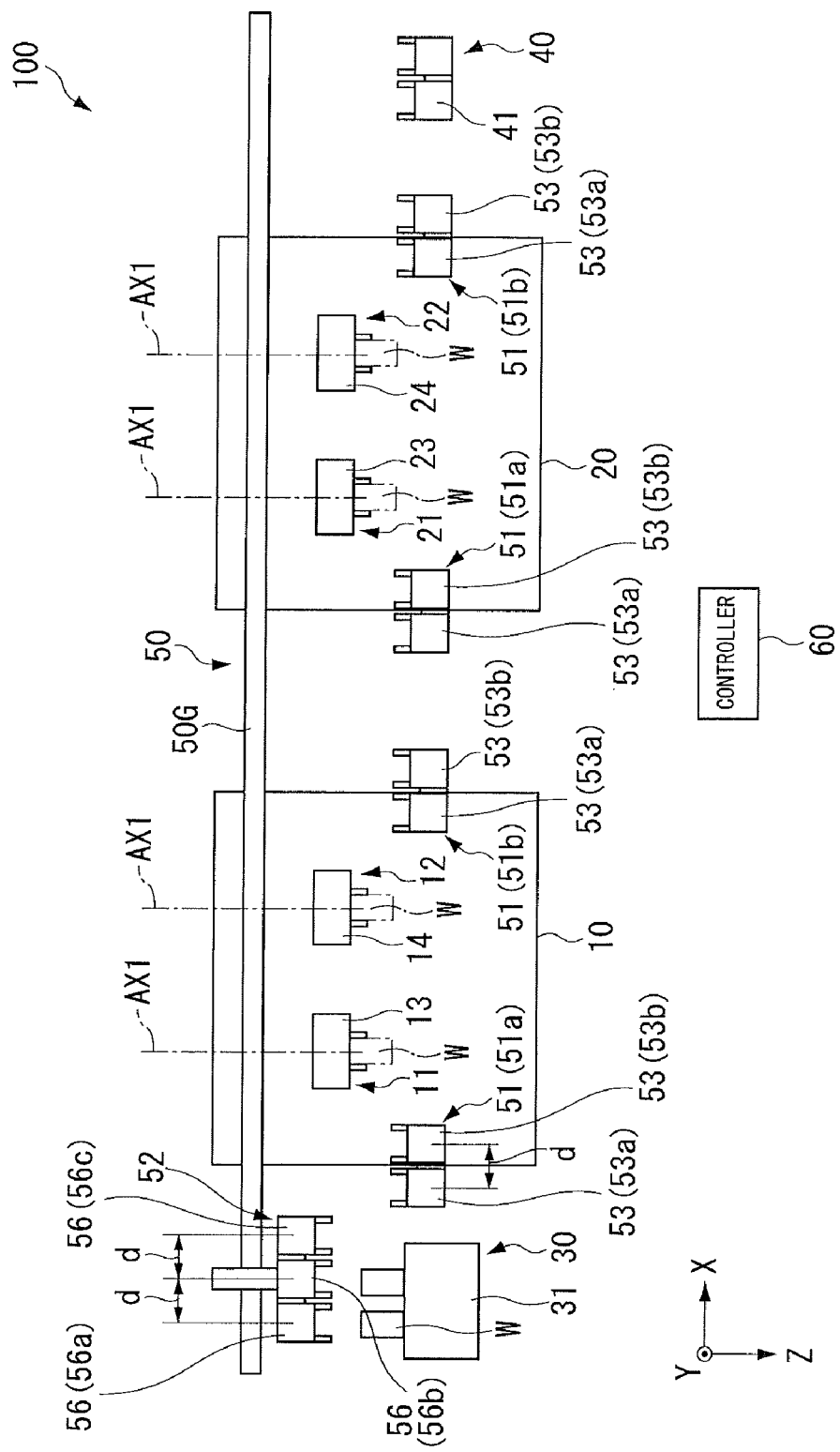
FIG. 1 is a diagram illustrating an example of a workpiece conveyance system and a machine tool system according to a first configuration.

AX1 rotation axis
D interval
P1 first position
P2 second position
W workpiece
10 first body (machine tool body)
11, 12, 21, 22 spindle (workpiece holder)
13, 14, 23, 24 spindle chuck
20 second body (machine tool body)
30 carrying-in part
40 carrying-out part
41 carrying-out chuck
50, 250, 350, 450 workpiece conveyance system
50G, 350G guide
51, 51a to 51d, 451 relay loader
52, 252, 352 main loader
53, 53a, 53b relay loader chuck
56, 56a to 56e main loader chuck
58 switching structure
60 controller
100, 200 machine tool system

DETAILED DESCRIPTION

Hereinafter, examples/configurations will be described with reference to the drawings. However, this disclosure is not limited to the forms illustrated in the drawings. In the drawings, to describe the content, the scale is appropriately changed by enlarging or emphasizing a part, for example. In each of the following drawings, directions in the drawings will be described using an XYZ coordinate system. In the XYZ coordinate system, a plane parallel with a horizontal plane is defined as an XZ plane. In the XZ plane, a direction of a spindle 11 or the like is denoted as a Z direction and a direction orthogonal to the Z direction is denoted as an X direction. Furthermore, a direction perpendicular to the XZ plane is denoted as a Y direction. Each of the X direction, the Y direction, and the Z direction will be described on the assumption that in the drawings, the arrow direction is a positive (+) direction and a direction opposite to the arrow direction is a negative (−) direction.

First Configuration

A first configuration will be described with reference to the drawings. FIG. 1 is a diagram illustrating an example of a workpiece conveyance system 50 and a machine tool system 100 according to the first configuration. As illustrated in FIG. 1, the machine tool system 100 includes a first body (machine tool body) 10, a second body (machine tool body) 20, a carrying-in part 30, a carrying-out part 40, the workpiece conveyance system 50, and a controller 60. The controller 60 is a controller of the machine tool system 100 and is a controller of the workpiece conveyance system 50. However, the configuration is not limited to one controller 60 and the controller of the machine tool system 100 and the controller of the workpiece conveyance system 50 may also be installed separately.

The first body 10 and the second body 20, for example, are parallel double spindle lathes and are disposed in the +Z direction as a front side. The first body 10 has spindles (workpiece holders) 11 and 12, and a cutting tool holder such as a turret (not illustrated) that holds a cutting tool. The cutting tool holder such as the turret holds a plurality of cutting tools that cut a workpiece W, and one of the cutting tools is selected for use. The two spindles 11 and 12 are juxtaposed in the X direction. Each of the spindles 11 and 12 is rotatably supported around the axial line of a rotation axis AX1 parallel with the Z direction by a bearing or the like (not illustrated).

Spindle chucks 13 and 14 are disposed at ends of the spindles 11 and 12 on the +Z side, respectively. The spindle chucks 13 and 14 include a plurality of grasping claws 13A and 14A (see FIG. 5), and can hold the workpieces W toward the +Z direction by closing the grasping claws 13A and 14A, respectively.

Similar to the first body 10, the second body 20 has spindles (workpiece holders) 21 and 22, and a cutting tool holder such as a turret (not illustrated) that holds a cutting tool. The cutting tool holder such as the turret holds a plurality of cutting tools that cut the workpiece W, and one of the cutting tools is selected for use. The two spindles 21 and 22 are juxtaposed in the X direction. Each of the spindles 21 and 22 is rotatably supported around the axial line of the rotation axis AX1 parallel with the Z direction by a bearing or the like (not illustrated). Similar to the spindles 11 and 12, spindle chucks 23 and 24 are disposed at ends of the spindles 21 and 22 on the +Z side, respectively. The spindle chucks 23 and 24 include a plurality of grasping claws 23A and 24A (see FIG. 5), and can hold the workpieces W toward the +Z direction by closing the grasping claws 23A and 24A, respectively.

The spindles 11 and 12 and the spindles 21 and 22 are parallel with each other, the ends of these spindles 11, 12, 21, and 22 on the +Z side are disposed to be aligned in the X direction (spindle chucks 13, 14, 23, and 24 are aligned in the X direction). In this example, the number of spindles of each of the first body 10 and the second body 20 is 2 but is not limited thereto; n spindles (where n is an integer satisfying n≥2) may be disposed, and three or more spindles may be disposed.

The carrying-in part 30 allows an unmachined workpiece W to be machined to be placed thereon in the machine tool system 100. The carrying-in part 30 has a holding table 31 that holds the workpieces W. The holding table 31 holds two or more (two in this example) unmachined workpieces W. A plurality of workpieces W are juxtaposed at an interval d to be described later. The carrying-in part 30 is configured to be able to deliver the unmachined workpiece W to a main loader 52 to be described later. Details of the carrying-in part 30 will be described later.

The carrying-out part 40 holds a machined workpiece W machined by the first body 10 or the second body 20 in the machine tool system 100. The carrying-out part 40 has a plurality of (two in this example) carrying-out chucks 41 capable of holding the machined workpiece W. The carrying-out chucks 41 are juxtaposed at the interval d to be described later. Each of the carrying-out chucks 41 can hold the workpiece W toward the −Z direction. However, the carrying-out part 40 is not limited to being provided with the carrying-out chucks 41 and, for example, may include a placement table on which the machined workpiece W is simply placed.

The workpiece conveyance system 50 has relay loaders 51 (relay loaders) and a main loader 52 (main loader). The relay loaders 51 are disposed corresponding to n respective spindles 11 and 12 in the first body 10 (where n is an integer satisfying n≥2; n=2 in this example) and are disposed corresponding to n respective spindles 21 and 22 in the second body 20 (where n is an integer satisfying n≥2; n=2 in this example). Two relay loaders 51 are disposed at two positions of the −X side of the spindle 11 and the +X side of the spindle 12 in the first body 10, and are disposed at two positions of the −X side of the spindle 21 and the +X side of the spindle 22 in the second body 20. Hereinafter, when the two relay loaders 51 disposed in each of the first body 10 and the second body 20 are distinguished from each other, the relay loaders 51 on the −X side, that is, the relay loaders 51 disposed corresponding to the spindles 11 and 21 are denoted as relay loaders 51a. Furthermore, the relay loaders 51 on the +X side, that is, the relay loaders 51 disposed corresponding to the spindles 12 and 22 are denoted as relay loaders 51b.

The relay loader 51 has a plurality of (two in this example) relay loader chucks 53. Hereinafter, when the two relay loader chucks 53 are distinguished from each other, the relay loader chuck 53 on the −X side is denoted as a relay loader chuck 53a and the relay loader chuck 53 on the +X side is denoted as a relay loader chuck 53b. The relay loader chucks 53 are disposed at the same interval d as that among a plurality of main loader chucks 56 disposed in the main loader 52 to be described later.

The number of relay loader chucks 53 provided in one relay loader 51 is not limited to 2, and three or more relay loader chucks 53 may be provided. When three or more relay loader chucks 53 are disposed, the respective relay loader chucks 53 are disposed to be aligned in one direction at the predetermined interval d. Each of the relay loader chucks 53 includes grasping claws, a sucker or the like (not illustrated) that hold the workpiece W, and can hold the workpiece W toward the −Z direction, that is, a direction parallel with the rotation axes AX1 of the spindles 11, 12, 21, and 22. The relay loader chuck 53 receives and delivers the workpiece W from/to each of the spindles 11, 12, 21, and 22.

Each of the relay loader chucks 53 can move back and forth in the −Z direction, and when delivering the workpiece W to the spindle 11 or the like, moves in the −Z direction to receive and deliver the workpiece W. However, this example is not limited to when the relay loader chuck 53 moves back and forth in the −Z direction, and the spindle 11 or the like may move back and forth in the +Z direction when receiving and delivering the workpiece W. The relay loader chuck 53 moves in the −Z direction so that an unmachined workpiece W is delivered from the relay loader chuck 53 to the spindle 11 or the like, or a machined workpiece W is received in the relay loader chuck 53 from the spindle 11 or the like. Details of the relay loader 51 will be described later using other drawings.

The main loader 52 conveys the workpiece W between the carrying-in part 30 and the relay loader 51 and between the relay loader 51 and the carrying-out part 40. The main loader 52 includes a loader head (for example, see a loader head 52B in FIG. 3), and the loader head has n+m main loader chucks 56 (where m is an integer satisfying m≥1). When the number of main loader chucks 56 is 3, that is, n=2 and m=1 will be described. Hereinafter, when three main loader chucks 56 are distinguished from one another, the main loader chuck 56 on the most −X side is denoted as a main loader chuck 56a, the main loader chuck 56 at the center in the X direction is denoted as a main loader chuck 56b, and the main loader chuck 56 on the most +X side is denoted as a main loader chuck 56c.

Each of the main loader chucks 56 includes a plurality of grasping claws 57 (see FIG. 2) that grasp the workpiece W and can hold the workpiece W toward the +Z direction, that is, the direction parallel with the rotation axes AX1 of the spindles 11, 12, 21, and 22 by closing the grasping claws 57. The main loader chuck 56 receives the workpiece W from the carrying-in part 30 or delivers the workpiece W to the carrying-out part 40. The main loader chuck 56 can move back and forth in the +Z direction. When receiving the workpiece W from the carrying-in part 30 or when delivering the workpiece W to the carrying-out part 40, the main loader chuck 56 moves in the +Z direction with respect to the carrying-in part 30 or the carrying-out part 40.

Furthermore, the main loader chuck 56 receives and delivers the workpiece W from/to the relay loader chuck 53. When receiving and delivering the workpiece W, the main loader chuck 56 moves in the +Z direction toward the relay loader chuck 53. However, this example is not limited thereto and the relay loader chuck 53 may move in the −Z direction toward the main loader chuck 56. The main loader chucks 56 may be configured to move back and forth in the +Z direction individually, or to move back and forth in the +Z direction as a whole (for example, together with the loader head). When the main loader chucks 56 move back and forth in the +Z direction as a whole, it is possible to simplify a driving system in the Z direction in the main loader chucks 56.

The main loader chucks 56, for example, are disposed to be aligned in the X direction at the predetermined interval d. Consequently, the relay loader 51 and the main loader 52 are allowed to face each other in the Z direction, two relay loader chucks 53 and two of the three main loader chucks 56 are brought into a state in which they face each other in a one-to-one manner.

The main loader 52 has a guide 50G. The guide 50G is disposed along the carrying-in part 30, the first body 10, the second body 20, and the carrying-out part 40. The main loader chuck 56 is movable along the guide 50G in the X direction (horizontal direction and direction orthogonal to the direction of the rotation axis AX1 of the spindle 11 or the like) together with the loader head (not illustrated) by driving a driving device (not illustrated). The main loader chuck 56 moves in the X direction so that the main loader chuck 56 can be disposed for each of the carrying-in part 30, the first body 10, the second body 20, and the carrying-out part 40. Furthermore, when the main loader chuck 56 is disposed for the carrying-in part 30 or the like, a height of the guide 50G is set such that the main loader chuck 56 can receive and deliver the workpiece W at the height thereof. However, the main loader chuck 56 (or the loader head (not illustrated)) can also move vertically, and the height of the guide 50G can be arbitrarily set.

The controller 60 collectively controls the operations of the first body 10, the second body 20, the carrying-in part 30, the carrying-out part 40, and the workpiece conveyance system 50 on the basis of a predetermined machining program. The controller 60 includes a communication part (not illustrated), and instructs the operations of the first body 10, the second body 20, the carrying-in part 30, the carrying-out part 40, and the workpiece conveyance system 50 and receives various types of information such as an operation status of each part by the communication part. Communication between the controller 60 and each part may be performed in a wired or wireless manner.

Figure 2:
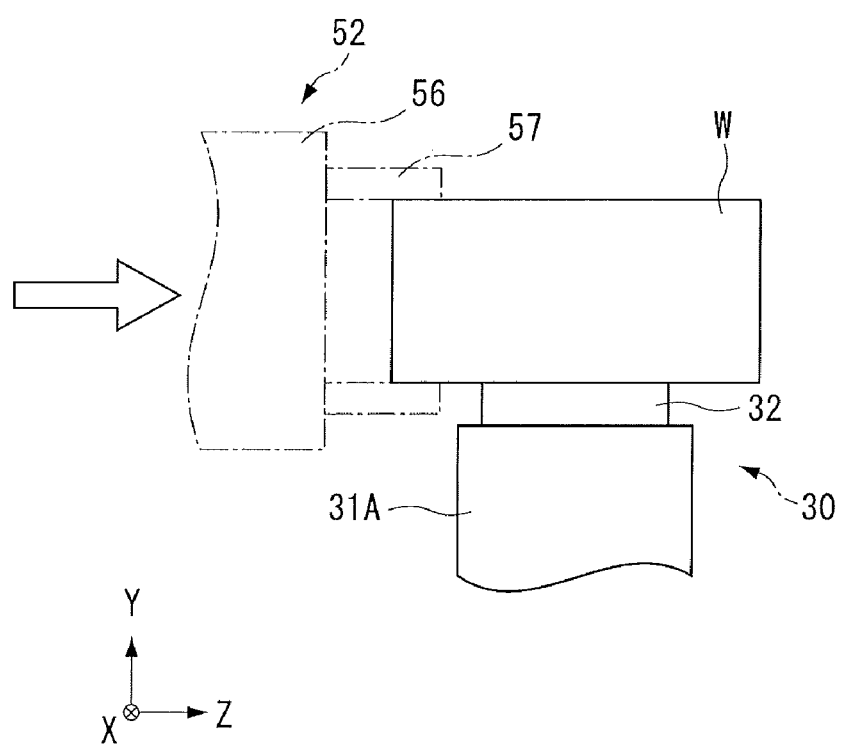
FIG. 2 is a diagram illustrating an example of a carrying-in part.

FIG. 2 is a diagram illustrating an example of the carrying-in part 30. As illustrated in FIG. 2, the carrying-in part 30 includes a holding table 31A and a conveyor belt 32. The conveyor belt 32 can transport the workpiece W by placing the workpiece W on the upper surface thereof. The conveyor belt 32 is rotated in the X direction or the Z direction by a driver (not illustrated) in the state in which the workpiece W is placed thereon. The workpiece W, for example, is placed on the conveyor belt 32 at a position different from the carrying-in part 30, and is disposed on the carrying-in part 30 by the rotation of the conveyor belt 32. As described above, the workpiece W is placed on the conveyor belt 32 so that the workpieces W can be continuously disposed on the carrying-in part 30 and the arrangement positions of the workpieces W on the carrying-in part 30 can be adjusted. The carrying-in part 30 is not limited to being provided with the conveyor belt 32 and may be configured to simply place the workpiece W on the holding table 31A.

As illustrated in FIG. 2, the conveyor belt 32 places the workpiece W in a transverse direction, that is, in a state in which the center axis of the workpiece W is aligned along the Z direction. When the workpiece W is placed in the transverse direction, a positioning protrusion or the like may be provided on the conveyor belt 32, for example, such that the workpiece W does not roll on the conveyor belt 32. When the workpiece W is placed in the transverse direction, the main loader chuck 56 of the main loader 52 moves in the transverse direction from the −Z side of the workpiece W, and receives the workpiece W by grasping the workpiece W. Furthermore, the workpiece W is placed on the conveyor belt 32 with the −Z side of the workpiece W protruding to not interfere with the conveyor belt 32 or the holding table 31A when the main loader chuck 56 receives the workpiece W. As described above, the workpiece W is placed on the carrying-in part 30 in the transverse direction so that it is possible to receive the workpiece W with the main loader chuck 56 of the main loader 52 directed to the transverse direction (toward the +Z direction) and it is not necessary to provide a structure that changes the orientation of the main loader chuck 56.

FIG. 3 is a diagram illustrating another example of the main loader. As illustrated in FIG. 3, the conveyor belt 32 may also place the workpiece W in a longitudinal direction, that is, in a state in which the center axis of the workpiece W is aligned along the Y direction. When an end surface of the workpiece W is a flat surface, the workpiece W can be placed on the conveyor belt 32 in the longitudinal direction. When the workpiece W is placed in the longitudinal direction, it is necessary to move the main loader chuck 56 of a main loader 52A toward the +Y direction (that is, the longitudinal direction) from the upper side to the lower side of the workpiece W. However, when the workpiece W is received and delivered from/to another part other than the carrying-in part 30, since the main loader chuck 56 needs to direct the workpiece W toward the +Z direction (that is, the transverse direction), the main loader 52A needs to have a structure that changes the orientation of the main loader chuck 56.

As illustrated in FIG. 3, the main loader 52A includes a switching structure 58 that switches the orientation of the main loader chuck 56. The switching structure 58 includes a driver (not illustrated), is provided between the loader head 52B and the main loader chuck 56, and switches the orientation of the main loader chuck 56 between the +Z direction (transverse direction) and the −Y direction (longitudinal direction) by the driver. The switching structure 58 includes the driver (not illustrated) and switches the orientation of the main loader chuck 56 by the driver. Furthermore, the main loader 52A includes a lifting device (not illustrated) that moves the loader head 52B up and down, and moves the main loader chuck 56 up and down together with the loader head 52B.

The main loader 52A configured as above sets the main loader chuck 56 downward by the switching structure 58 above the workpiece W placed on the carrying-in part 30, moves down the main loader chuck 56 by the lifting device (not illustrated), and holds the workpiece W by closing the grasping claws 57 at a stage where the grasping claws 57 are positioned outside the upper portion of the workpiece W. Thereafter, the main loader chuck 56 is switched in the transverse direction by the switching structure 58 so that the workpiece W is held toward the +Z direction. As a consequence, it is possible to receive and deliver the workpiece W from/to the relay loader chuck 53 of the relay loader 51.

Figure 4:
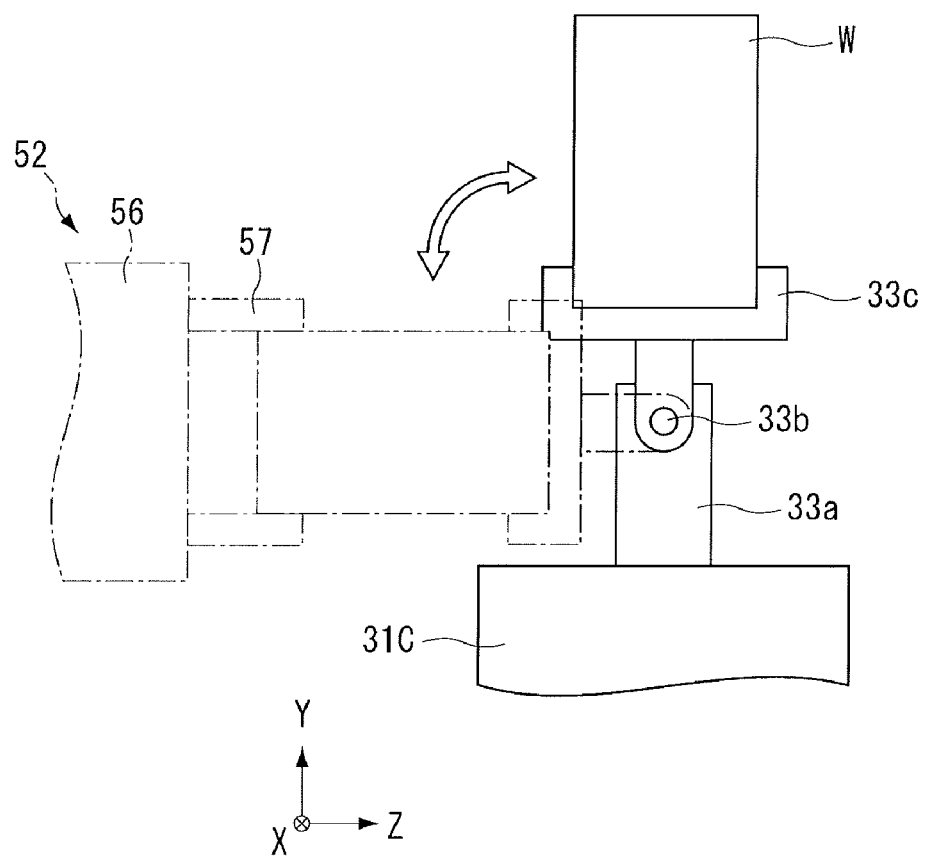
FIG. 4 is a diagram illustrating another example of a carrying-in part.

FIG. 4 is a diagram illustrating another example of the carrying-in part 30. When the switching structure 58 is not provided in the main loader 52A illustrated in FIG. 3 since it is necessary to receive the workpiece W in the transverse direction, the workpiece W, which is placed on the carrying-in part 30 in the longitudinal direction, is changed in the transverse direction so that it is possible to receive the workpiece W from the carrying-in part 30 by the main loader chuck 56. The carrying-in part 30 illustrated in FIG. 4 can switch the workpiece W from the longitudinal direction to the transverse direction. As illustrated in FIG. 4, the carrying-in part 30 has a holding table 31c and a holding structure 33 that holds the workpiece W. The holding structure 33 has a base portion 33a, a shaft portion 33b, and a holding portion 33c. The base portion 33a is attached to the holding table 31c. However, instead of this, for example, the base portion 33a may be attached to a conveyor, a rotary table or the like for movement. The shaft portion 33b is disposed in parallel with the X direction on the upper portion of the base portion 33a.

The holding portion 33c is rotatable in the direction around the axis in the X direction centering on the shaft portion 33b with respect to the base portion 33a, and is rotated by the driver (not illustrated). The holding portion 33c includes grasping claws, a sucker or the like and holds an end portion of the workpiece W. When the holding portion 33c moves in the direction around the axis of the shaft portion 33b, the orientation of the workpiece W can be switched between the transverse direction (Z direction) and the longitudinal direction (Y direction). Consequently, for example, in a state in which the workpiece W has been transported to the carrying-in part 30, even though the workpiece W is directed in the longitudinal direction, when the workpiece W is delivered to the main loader 52, it is possible to dispose the workpiece W from the longitudinal direction to the transverse direction by rotating the holding portion 33c. As a consequence, the main loader chuck 56 of the main loader 52 can receive the workpiece W in the transverse direction from the +Y side.

Figure 5:
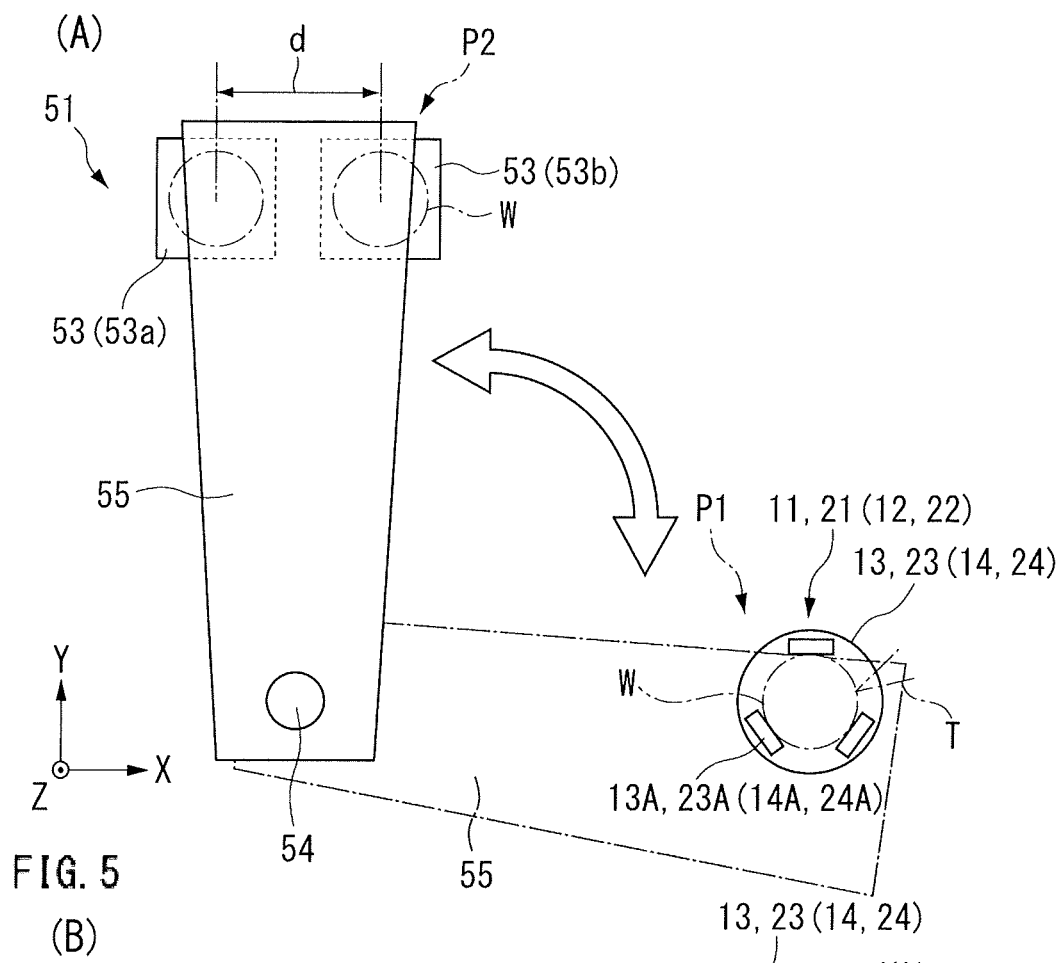
FIGS. 5(A) and 5(B) illustrate an example of a relay loader, in which (A) is a diagram viewed from a +Z direction and (B) is a diagram viewed from a +Y direction.

FIG. 5 is a diagram illustrating an example of the relay loader 51 in which (A) illustrates when the relay loader 51 is viewed from the +Z direction (front side) and (B) illustrates when the relay loader 51 is viewed from the +Y direction (upper side). As illustrated in FIG. 5, the relay loader 51 has relay loader chucks 53, a shaft 54, and a turning plate 55. The relay loader chucks 53 are fixed to the turning plate 55. The center axis AX2 of the shaft 54 is disposed in parallel with the Z direction. The turning plate 55 can be turned in the direction around the axis of the shaft 54 by the driver (not illustrated). In FIG. 5, the relay loader 51 corresponding to the spindles 11 and 21 is described as an example. However, the same applies to the relay loader 51 corresponding to the spindles 12 and 22 except that it is configured to be symmetrical to the configuration illustrated in FIG. 5 and the turning orientation of the turning plate 55 is opposite.

When the turning plate 55 is turned in the direction around the axis of the shaft 54, the relay loader 51 can move the relay loader chucks 53 between a first position P1 and a second position P2. When the turning plate 55 is at the first position P1, the relay loader chucks 53 face the spindle chucks 13 and 23 of the spindles 11 and 21. Furthermore, when the turning plate 55 is at the second position P2, the relay loader chucks 53 face the main loader chucks 56 of the main loader 52.

In the relay loader 51, the turning position of the turning plate 55 is adjusted so that it is possible to allow two relay loader chucks 53a and 53b and the spindles 11 and 21 to face each other at the first position P1. (A) in FIG. 5 illustrates a state in which the turning plate 55 indicated by one dot chain line allows the relay loader chuck 53a and the spindles 11 and 21 to face each other at the first position P1. Furthermore, as illustrated in (B) in FIG. 5, the relay loader 51 is provided to be movable back and forth in the −Z direction by the driver (not illustrated). The relay loader chuck 53 is movable between a retracted position P1a retracted in the +Z direction to prevent the workpiece W from interfering with the spindles 11 and 21 during the turning of the turning plate 55 and an advancing position P1b advanced in the −Z direction to be able to receive and deliver the workpiece W from/to the spindles 11 and 21. However, as described above, instead of the configuration in which the relay loader chuck 53 is movable back and forth in the −Z direction, it may be possible to employ a configuration in which the spindle chucks 13 and 23 are movable back and forth in the +Z direction.

Subsequently, the operation of the workpiece conveyance system 50 and the machine tool system 100 configured as described above will be described. FIG. 6 to FIG. 10 are diagrams illustrating an example of the operation of the machine tool system 100 including the workpiece conveyance system 50. In the following example, a description will be given for an operation from a state in which workpieces W are machined by a cutting tool T (see (A) in FIG. 5) in the spindles 11 and 12 of the first body 10 and the spindles 21 and 22 of the second body 20, and machined workpieces W are held on the relay loader chucks 53b of the relay loader 51 corresponding to the respective spindles 11, 12, 21, and 22. In the drawings, to distinguish the machined workpieces W from the unmachined workpieces W, a plurality of dots are provided to the machined workpieces W.

Figure 6:
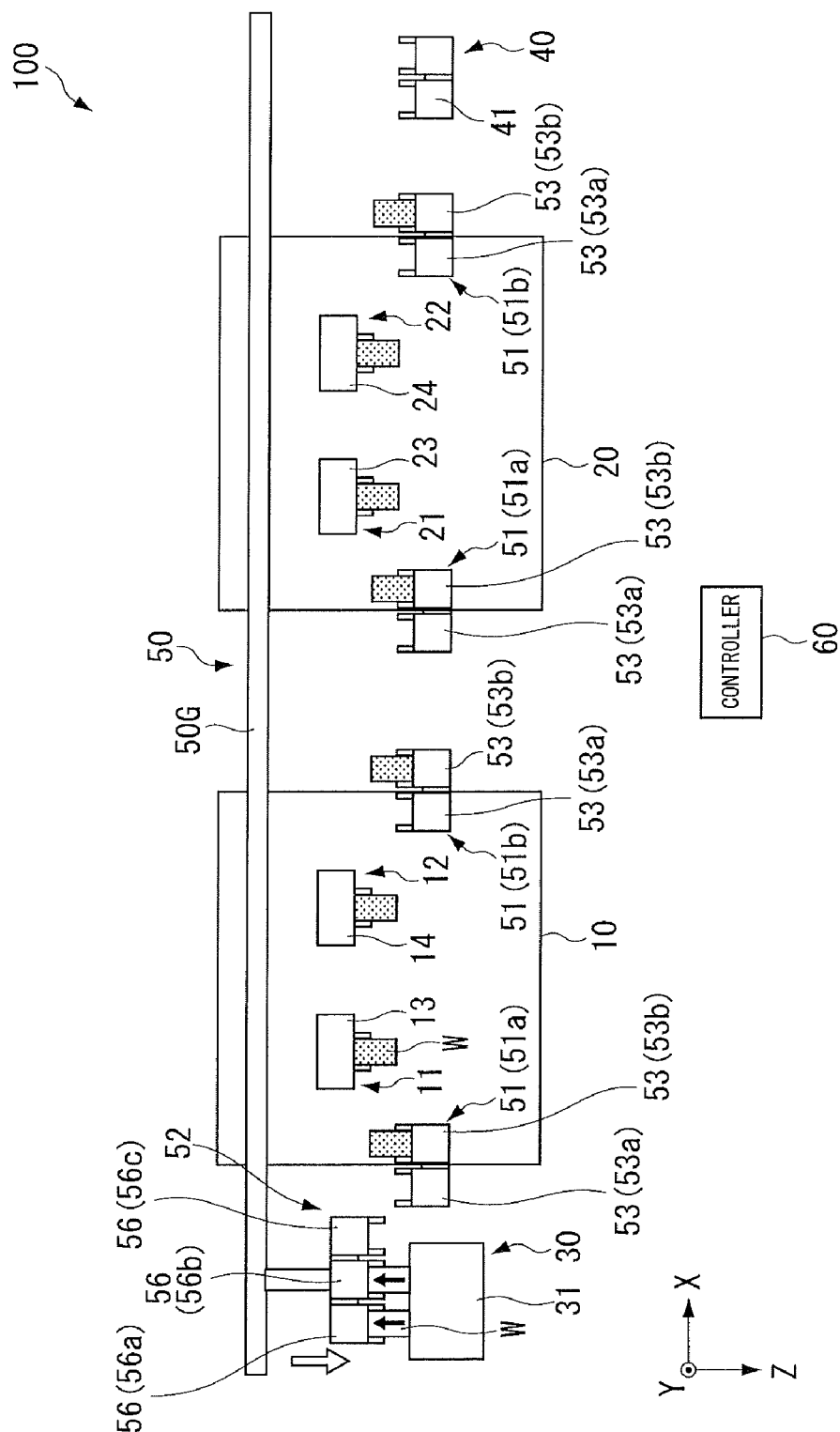
FIG. 6 is a diagram illustrating an example of an operation of the workpiece conveyance system.

As illustrated in FIG. 6, the controller 60 instructs the main loader 52 to receive two workpieces W placed in advance on the carrying-in part 30. The two workpieces W are disposed in advance on the carrying-in part 30 in the transverse direction and are set to have the interval d similar to the interval among three main loader chucks 56 or the interval between two relay loader chucks 53. The controller 60 moves the three main loader chucks 56 of the main loader 52 in the +Z direction, and allows two main loader chucks 56a and 56b of the three main loader chucks 56 to simultaneously receive the two unmachined workpieces W. A main loader chuck 56c may move in the +Z direction together with the other main loader chucks 56a and 56b, but is in an empty state of holding no workpiece W (state of holding no workpiece W, the same applies below).

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chucks 53 of the relay loader 51a corresponding to the spindle 11 of the first body 10. After or before the main loader chucks 56 are reached, in a state in which the relay loader chuck 53b of the relay loader 51a holds the machined workpiece W received from the spindle 11 and the relay loader chuck 53a is empty, the controller 60 disposes the relay loader chucks 53 at the second position P2. The controller 60 allows the relay loader chuck 53a in the empty state in the relay loader 51a and the main loader chuck 56b holding the unmachined workpiece W in the main loader 52 to face each other. In such a state, the relay loader chuck 53b holding the machined workpiece W in the relay loader 51a and the main loader chuck 56c in the empty state in the main loader 52 are in a state of simultaneously facing each other.

Figure 7:
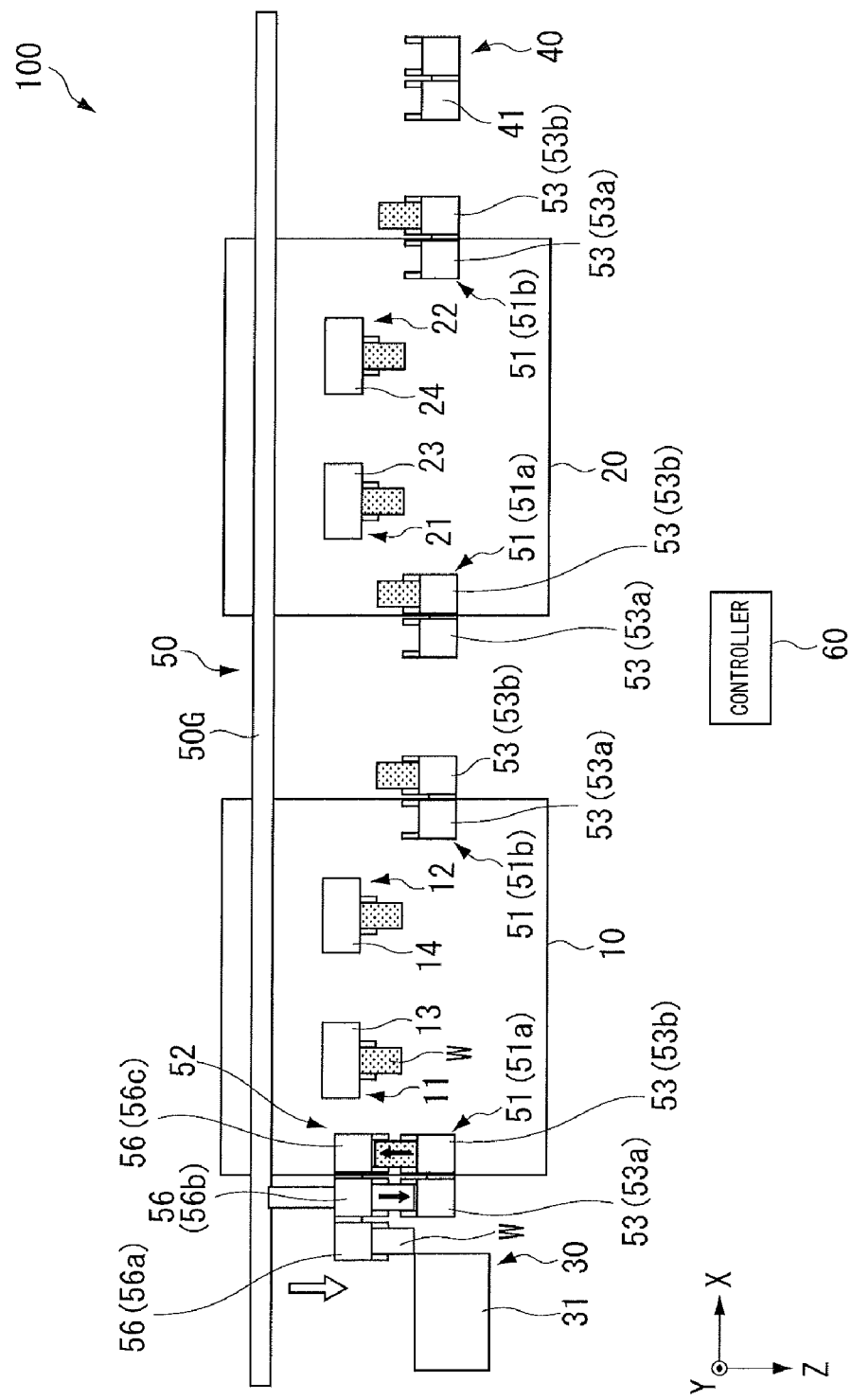
FIG. 7 is a diagram illustrating an example of an operation of the workpiece conveyance system, subsequently to FIG. 6.

Next, as illustrated in FIG. 7, the controller 60 moves the three main loader chucks 56 in the +Z direction to a position where the workpiece W can be received and delivered from/to the relay loader chucks 53. Subsequently, the controller 60 closes the main loader chuck 56c to hold the machined workpiece W and then releases the relay loader chuck 53b. As a consequence, the machined workpiece W is delivered from the relay loader chuck 53b to the main loader chuck 56c. Simultaneously or almost simultaneously, the controller 60 closes the relay loader chuck 53a to hold the unmachined workpiece W and then releases the main loader chuck 56b. As a consequence, the unmachined workpiece W is delivered from the main loader chuck 56b to the relay loader chuck 53a. As described above, the receiving and delivery of the unmachined workpiece W and the machined workpiece W between the relay loader 51a and the main loader 52 can be simultaneously performed in one operation.

With the aforementioned operation, in the relay loader 51a, the relay loader chuck 53a holds the unmachined workpiece W and the relay loader chuck 53b is in an empty state. Furthermore, in the main loader 52, the main loader chuck 56c holds the machined workpiece W and the main loader chuck 56b at the center is in an empty state. The main loader chuck 56a maintains the state of holding the unmachined workpiece W as is. In the receiving and delivery operation of the workpieces W, since it is not necessary to change the orientation of the relay loader chuck 53 or the main loader chuck 56 for the receiving and delivery of the workpieces W, and the receiving and delivery of the workpieces W are performed in one operation, it is possible to shorten a time required for receiving and delivering the workpieces W. In the above, the main loader chucks 56 move in the +Z direction; however, instead of this configuration, the relay loader chuck 53 may be allowed to move in the −Z direction.

In addition, during the conveyance of the workpiece W by the main loader 52 and the receiving and delivery of the workpiece W from/to the next relay loader 51*b*, the controller 60 performs a series of controls to turn the turning plate 55 (see FIG. 5) of the relay loader 51*a* having received the unmachined workpiece W to the first position P1, to allow the relay loader chuck 53*b* to receive a machined workpiece W from the spindle chuck 13 (see description of FIG. 8 to be described later), to turn the turning plate 55 by a predetermined amount, to allow the spindle chuck 13 to receive the unmachined workpiece W held by the relay loader chuck 53*a* (see description of FIG. 9 to be described later), to turn the turning plate 55 to the second position P2 in the state in which the relay loader chuck 53*b* holds the machined workpiece W (see description of FIG. 10 to be described later), and to allow the relay loader 51*a* to reach the state illustrated in FIG. 6. In a manner similar to the receiving delivery of the workpieces W between the relay loader chuck 53 and the spindle chuck 13, receiving and delivery of workpieces W between another relay loader chuck 53 and another main shaft chuck, 14, or the like, can also be performed.

Figure 8:
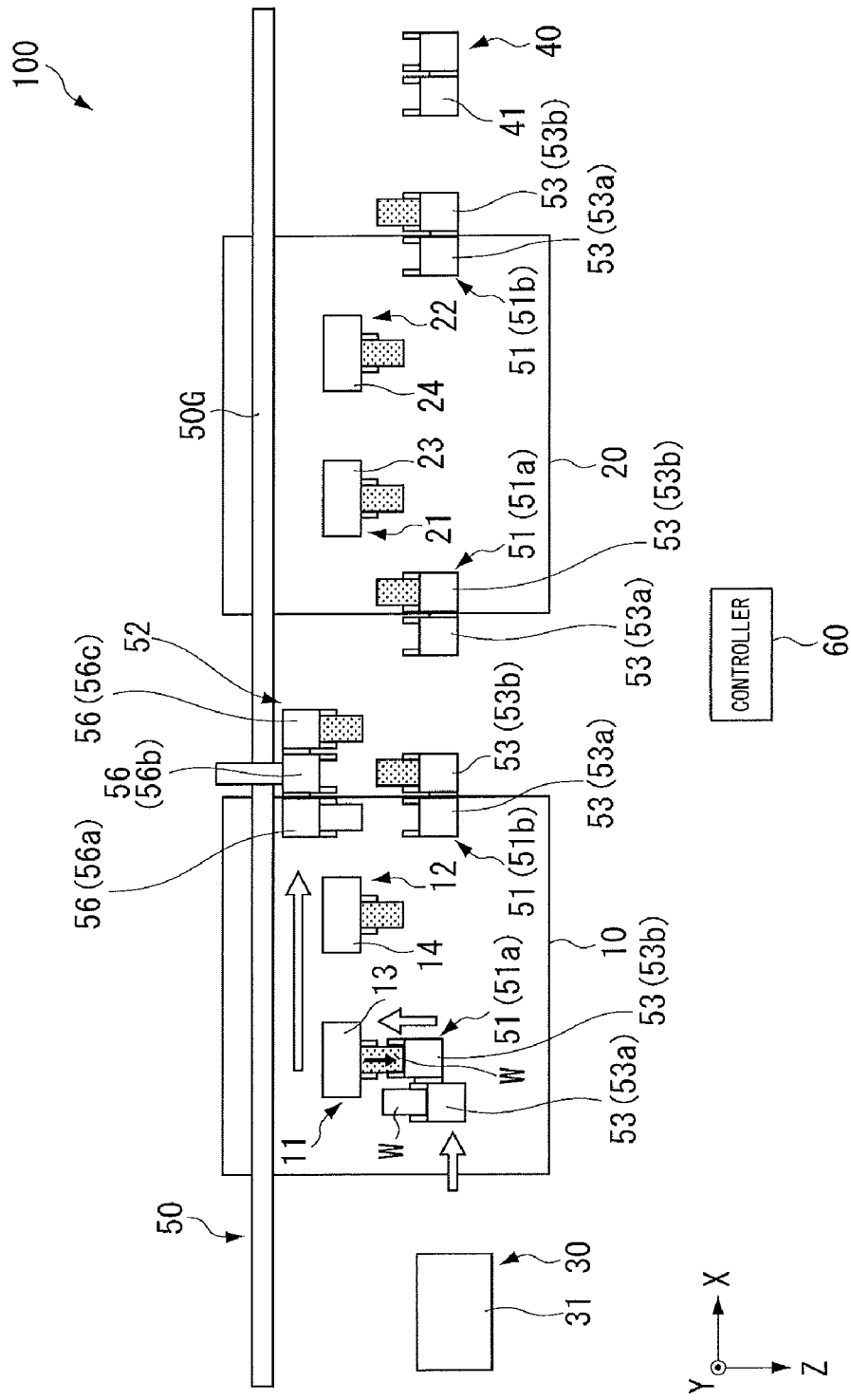
FIG. 8 is a diagram illustrating an example of an operation of the workpiece conveyance system, subsequently to FIG. 7.

Next, as illustrated in FIG. 8, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chucks 53 of the relay loader 51*b* corresponding to the spindle 12 of the first body 10. After or before the main loader chucks 56 are reached, in a state in which the relay loader chuck 53*b* of the relay loader 51*b* holds a machined workpiece W received from the spindle 12 and the relay loader chuck 53*a* is empty, the controller 60 disposes the relay loader chucks 53 at the second position P2. The controller 60 allows the relay loader chuck 53*a* in the empty state in the relay loader 51*b* and the main loader chuck 56*a* holding the unmachined workpiece W in the main loader 52 to face each other. In such a state, the relay loader chuck 53*b* holding the machined workpiece W in the relay loader 51*a* and the main loader chuck 56*b* in the empty state in the main loader 52 are in a state of simultaneously facing each other.

Figure 9:
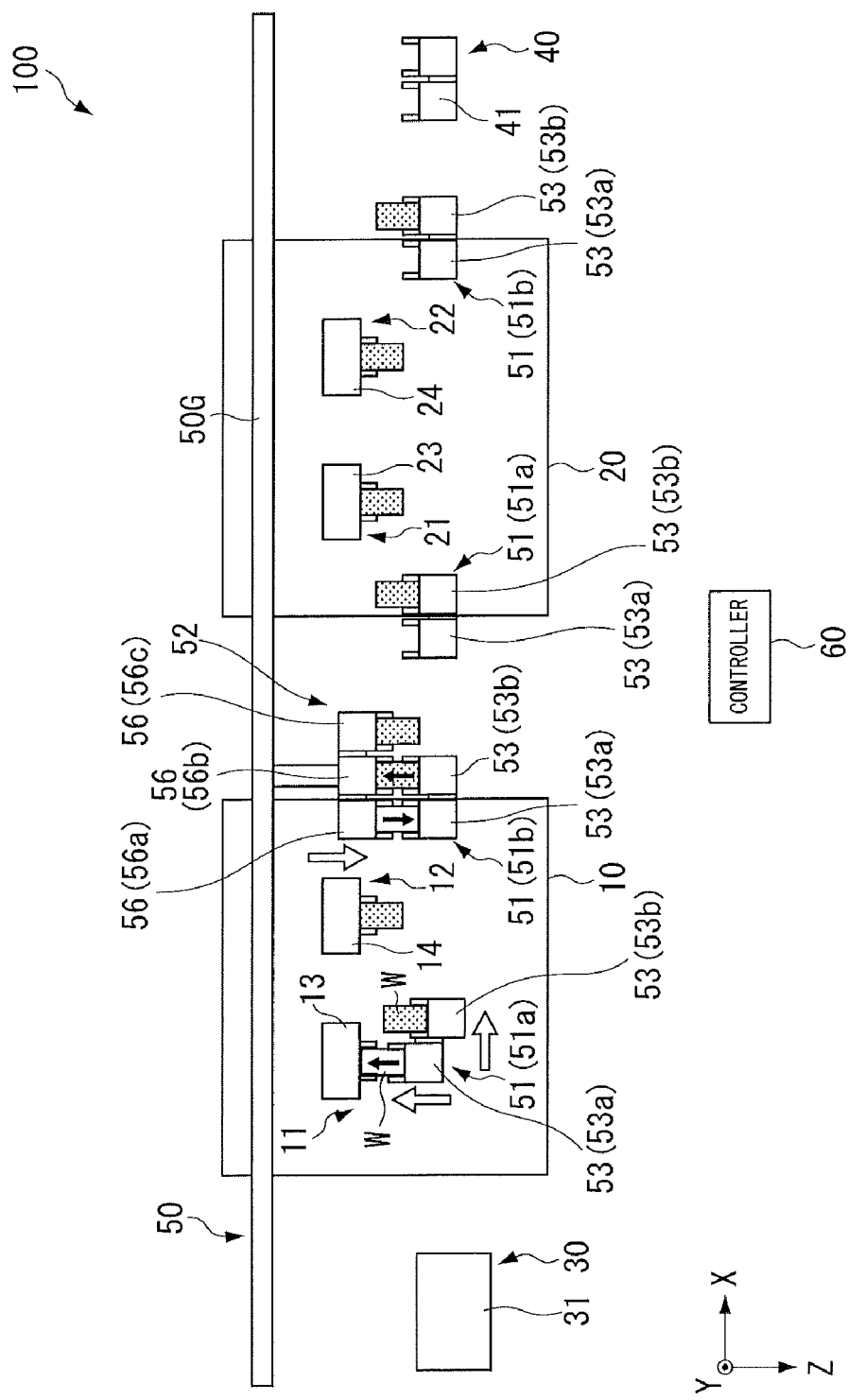
FIG. 9 is a diagram illustrating an example of an operation of the workpiece conveyance system, subsequently to FIG. 8.

Next, as illustrated in FIG. 9, the controller 60 moves the three main loader chucks 56 in the +Z direction to a position where the workpiece W can be received from and delivered to the relay loader 51*b*. Subsequently, the controller 60 closes the main loader chuck 56*b* to hold the machined workpiece W and then releases the relay loader chuck 53*b*. As a consequence, the machined workpiece W is delivered from the relay loader chuck 53*b* to the main loader chuck 56*b*. Simultaneously or almost simultaneously, the controller 60 closes the relay loader chuck 53*a* to hold the unmachined workpiece W and then releases the main loader chuck 56*a*. As a consequence, the unmachined workpiece W is delivered from the main loader chuck 56*a* to the relay loader chuck 53*a*. As described above, the receiving and delivery of the unmachined workpiece W and the machined workpiece W between the relay loader 51*b* and the main loader 52 can be simultaneously performed in one operation.

With the aforementioned operation, in the relay loader 51*b*, the relay loader chuck 53*a* holds the unmachined workpiece W and the relay loader chuck 53*b* is in an empty state. Furthermore, in the main loader 52, the main loader chuck 56*b* holds the machined workpiece W and the main loader chuck 56*a* is in an empty state. The main loader chuck 56*c* maintains the state of holding the machined workpiece W as is. Similar to the above description, the receiving and delivery operation of the workpieces W can shorten a time required for receiving delivering the workpieces W.

Figure 10:
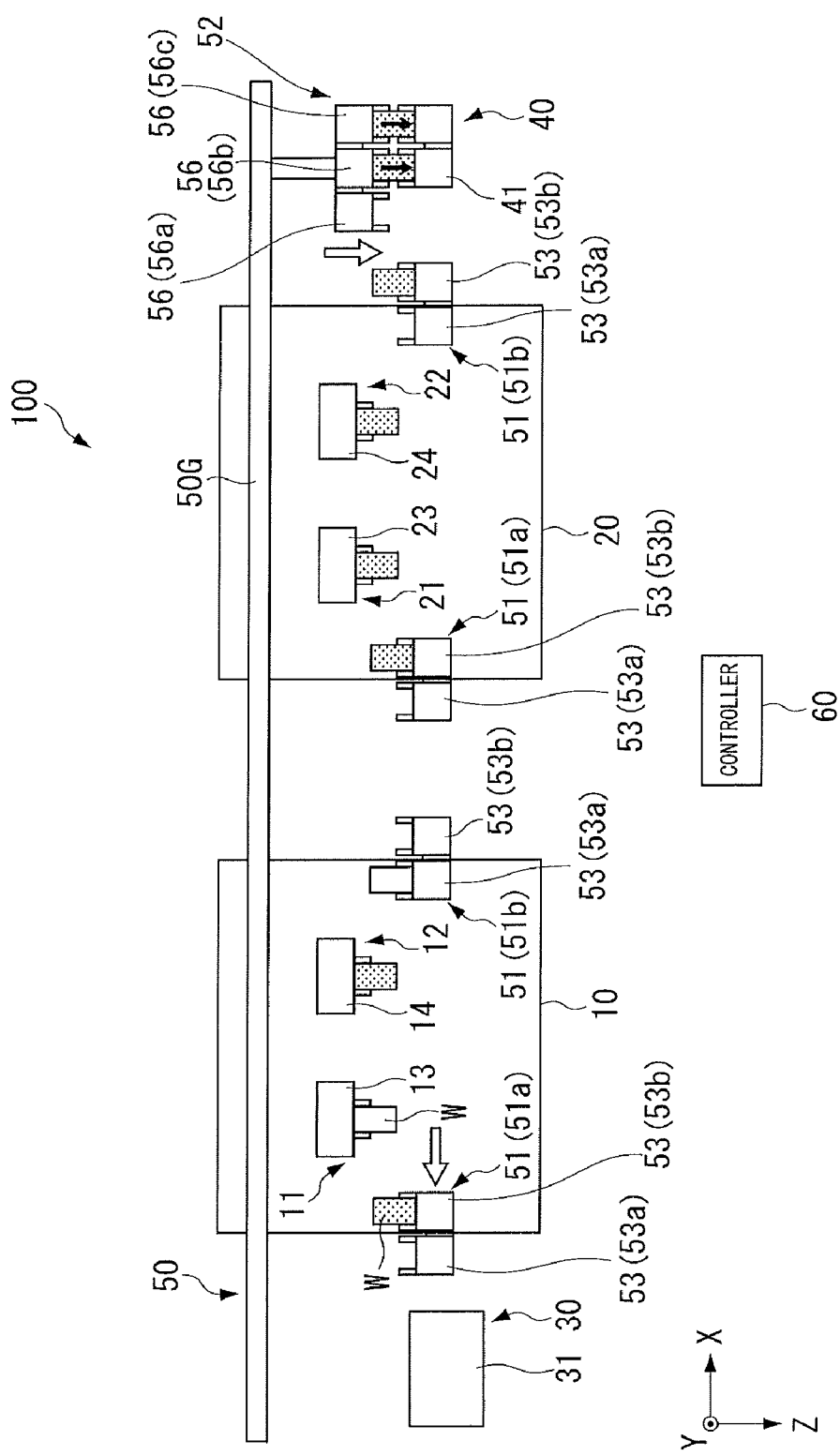
FIG. 10 is a diagram illustrating an example of an operation of the workpiece conveyance system, subsequently to FIG. 9.

Next, the controller 60 moves back the main loader chucks 56 in the −Z direction, then moves the main loader 52 along the guide 50G in the +X direction, and allows the main loader chucks 56 to face the carrying-out chucks 41 of the carrying-out part 40. The controller 60 can allow the two main loader chucks 56*b* and 56*c* holding the machined workpieces W and two carrying-out chucks 41 to face each other. An interval between the two carrying-out chucks 41 is set to the interval d, similar to the interval among the main loader chucks 56. Subsequently, as illustrated in FIG. 10, the controller 60 moves the main loader chucks 56 in the +Z direction to a position where the workpieces W can be received and delivered from/to the carrying-out chucks 41.

Subsequently, the controller 60 allows each carrying-out chuck 41 to hold the machined workpiece W and releases the main loader chucks 56*b* and 56*c*. As a consequence, the two machined workpieces W are simultaneously or almost simultaneously delivered from the main loader chucks 56*b* and 56*c* to the carrying-out chucks 41, respectively. As described above, between the main loader 52 and the carrying-out part 40, a plurality of (two) workpieces W can be simultaneously received and delivered in one operation. With such an operation, in the main loader 52, the three main loader chucks 56 are in an empty state, move along the guide 50G in the −X direction, and return to the carrying-in part 30 so that two unmachined workpieces W can be held by the main loader chucks 56 as illustrated in FIG. 6.

As described above, while the main loader 52 moves once in the +X direction from the carrying-in part 30 to the carrying-out part 40, the main loader 52 continuously receives and delivers workpieces W from/to the two relay loaders 51*a* and 51*b* disposed in the first body 10. That is, by one-time movement in the +X direction, the main loader 52 conveys two unmachined workpieces W on the carrying-in part 30 to the relay loaders 51*a* and 51*b*, respectively, receives machined workpieces W from the relay loaders 51*a* and 51*b*, and conveys the machined workpieces W to the carrying-out part 40.

Next, in a manner similar to the illustration in FIG. 6, the main loader chucks 56 hold two unmachined workpieces W on the carrying-in part 30, move along the guide 50G in the +X direction, deliver the unmachined workpiece W to the relay loader chucks 53 of the relay loader 51*a* corresponding to the spindle 21 of the second body 20, and receive machined workpieces W. The receiving and delivery operation of the workpieces W is similar to the operation illustrated in FIG. 7. Next, in a manner similar to the illustration in FIG. 8, the main loader chucks 56 move along the guide 50G in the +X direction, deliver unmachined workpieces W to the relay loader chucks 53 of the relay loader 51*b* corresponding to the spindle 22 of the second body 20, and receive machined workpieces W. The receiving and delivery operation of the workpieces W is similar to the operation illustrated in FIG. 9. Next, the main loader chucks 56 move along the guide 50G in the +X direction and deliver the machined workpieces W to the carrying-out chucks 41 of the carrying-out part 40.

In the main loader 52, the main loader chucks 56 are in an empty state and return to the carrying-in part 30 so that the main loader chucks 56 can hold two unmachined workpieces W as illustrated in FIG. 6. Such an operation is repeated so that unmachined workpieces W are continuously supplied to the spindles 11 and 12 of the first body 10 and the spindles 21 and 22 of the second body 20 and machined workpieces W are continuously collected. The machined workpieces W held by the carrying-out chucks 41 of the carrying-out part 40, for example, are transported from the carrying-out part 40 to another place by a conveyor device or the like. In this example, the receiving and delivery operation of the workpieces W by the main loader chucks 56 is repeated twice (n=2) for the spindles 11 and 12 or the spindles 21 and 22, respectively.

As described above, according to this example, since a plurality of the workpieces W can be simultaneously delivered and received, and the main loader 52 does not frequently reciprocate between the relay loaders 51 and the carrying-in part 30 or between the relay loaders 51 and the carrying-out part 40, a time required to receive and deliver the workpieces W is shortened to improve the efficiency in conveying the workpieces W, and thus the efficiency in machining the workpieces W can be improved. In the aforementioned configuration, an example corresponding to the first body 10 and the second body 20 each having two spindles has been described. However, even though each body has three or more spindles, (the number of spindles+m) main loader chucks 56 are disposed so that it is possible to cope with the situation in a manner similar to the above description. Furthermore, it would be similar to the above even though there are one or three or more bodies each having two spindles. Furthermore, the number of main loader chucks 56 is 3 (which is equal to the number of spindles (two) plus one). However, this example is not limited to this configuration and, for example, four or more main loader chucks 56 may be provided for two spindles because it is sufficient if the number of main loader chucks 56 is the number of spindles plus m.

Second Configuration

Figure 11:
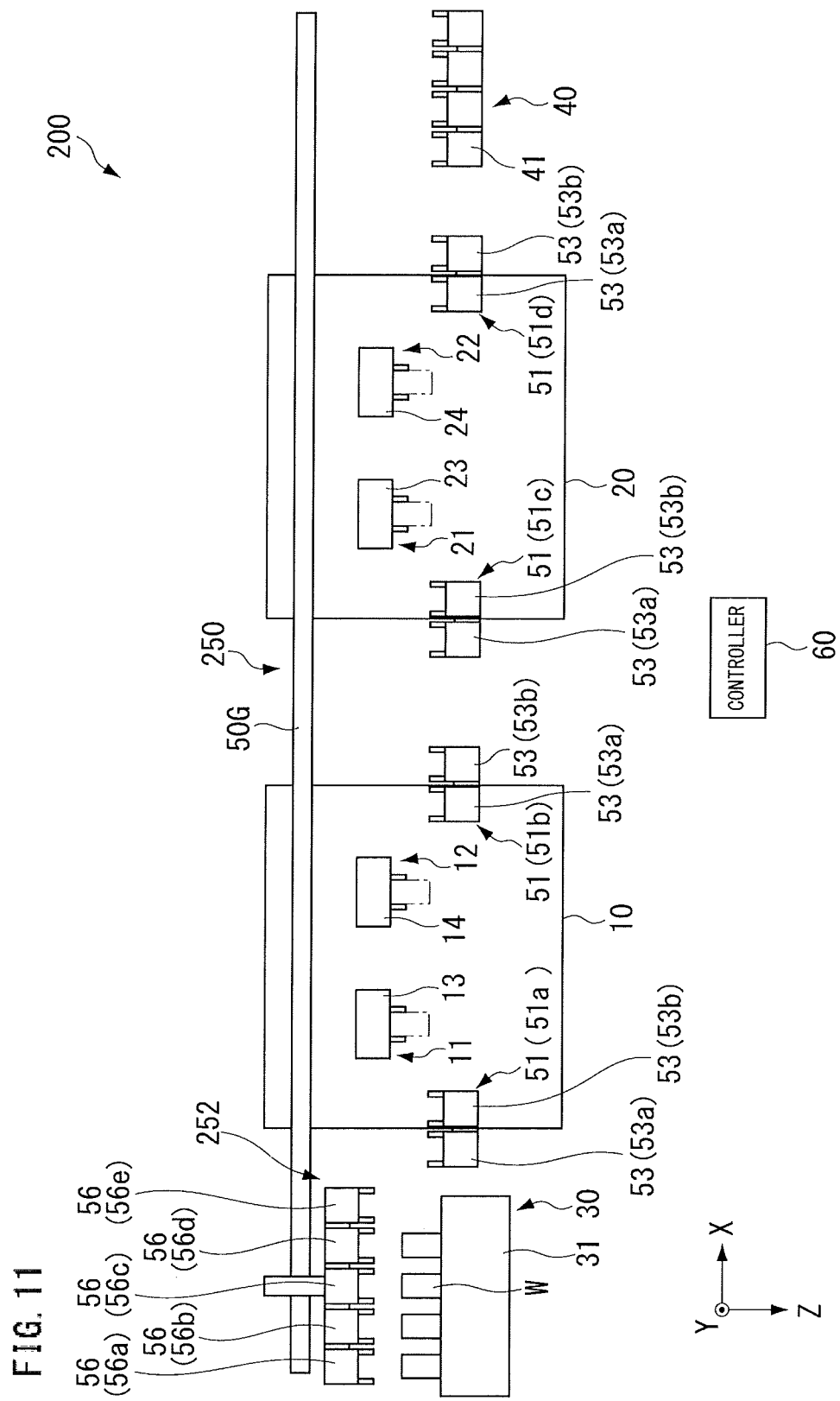
FIG. 11 is a diagram illustrating an example of a workpiece conveyance system and a machine tool system according to a second configuration.

A second configuration will be described with reference to the drawings. FIG. 11 is a diagram illustrating an example of a workpiece conveyance system 250 and a machine tool system 200 according to the second configuration. As illustrated in FIG. 11, the machine tool system 200 includes the first body (machine tool body) 10, the second body (machine tool body) 20, the carrying-in part 30, the carrying-out part 40, the workpiece conveyance system 250, and the controller 60. In the second configuration, the configuration of the workpiece conveyance system 250 is different from that of the first configuration and the other configurations are similar to those of the first configuration. In the following description, the same or equivalent components as those of the first configuration are denoted by the same reference numerals and a description thereof will be omitted or simplified.

The workpiece conveyance system 250 has relay loaders 51 and a main loader 252. The relay loader 51 has a configuration similar to that of the first configuration. In the first configuration, the number of spindles 11 and 12 of the first body 10 is set to n (which is an integer satisfying n≥2), but in the second configuration, the sum of the number of spindles 11 and 12 of the first body 10 and the number of spindles 21 and 22 of the second body 20 is set to n (which is an integer satisfying n≥2). Consequently, in this example, four relay loaders 51 disposed in the first body 10 and the second body 20 are distinguished from one another, and a relay loader 51a is disposed corresponding to the spindle 11 of the first body 10, a relay loader 51b is disposed corresponding to the spindle 12 of the first body 10, a relay loader 51c is disposed corresponding to the spindle 21 of the second body 20, and a relay loader 51d is disposed corresponding to the spindle 22 of the second body 20.

Furthermore, in this example, the main loader 252 has five main loader chucks 56 of n+1 (m=1). The five main loader chucks 56 are juxtaposed at the interval d in the X direction. Each of the main loader chucks 56 has a configuration similar to that of the first configuration described above. Hereinafter, when the five main loader chucks 56 are distinguished from one another, they are sequentially denoted as main loader chucks 56a, 56b, 56c, 56d, and 56e from the −X side to the +X side.

On the carrying-in part 30, four unmachined workpieces W are placed in parallel to correspond to the main loader chucks 56a to 56d. The fact that the four workpieces W are disposed at the interval d is similar to that of the first configuration. Furthermore, the carrying-out part 40 has four carrying-out chucks 41 to correspond to the main loader chucks 56a to 56d. The fact that the carrying-out chucks 41 are juxtaposed at the interval d is similar to that of the first configuration.

Figure 12:
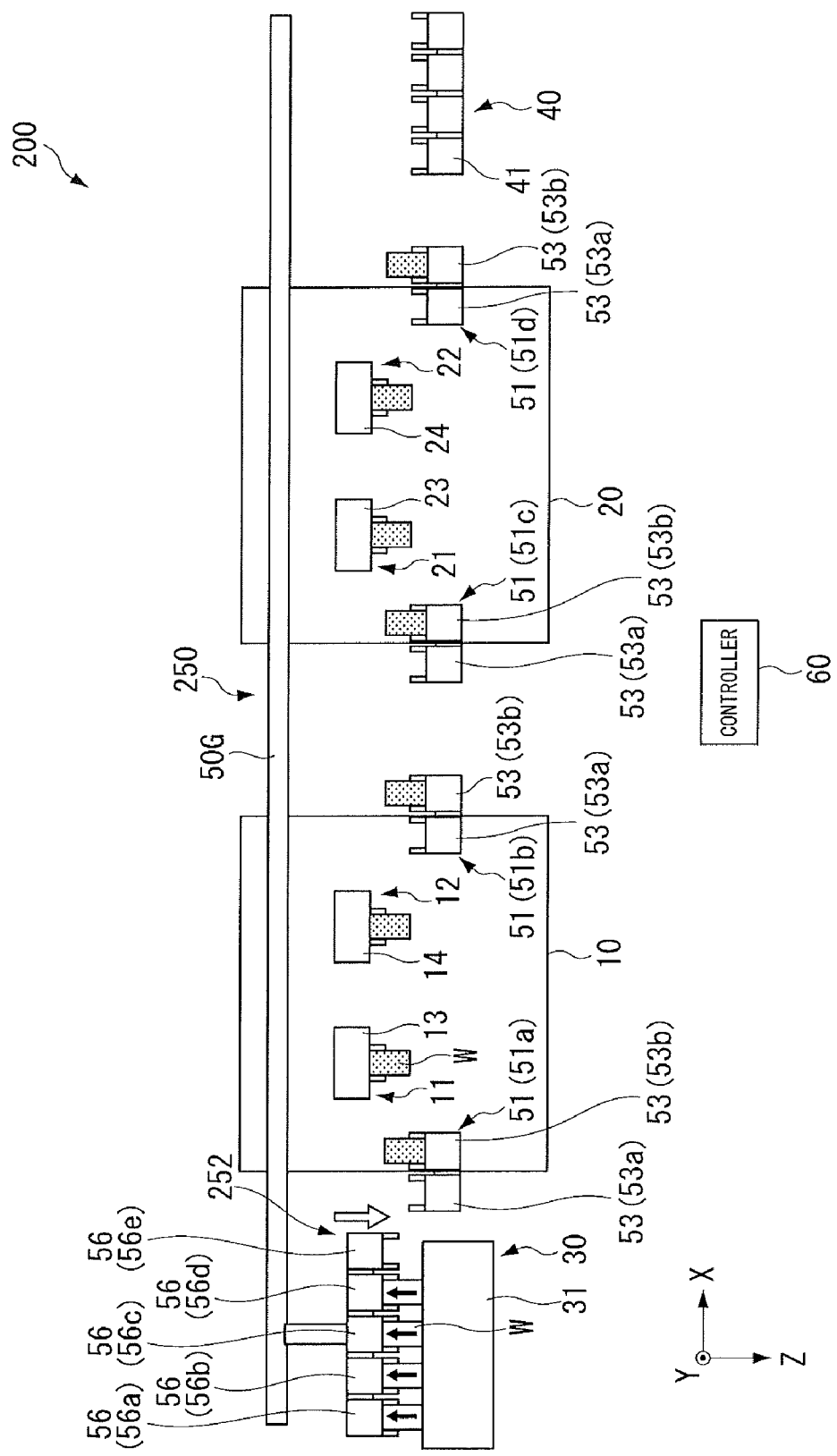
FIG. 12 is a diagram illustrating an example of an operation of the workpiece conveyance system, subsequently to FIG. 11.
Figure 13:
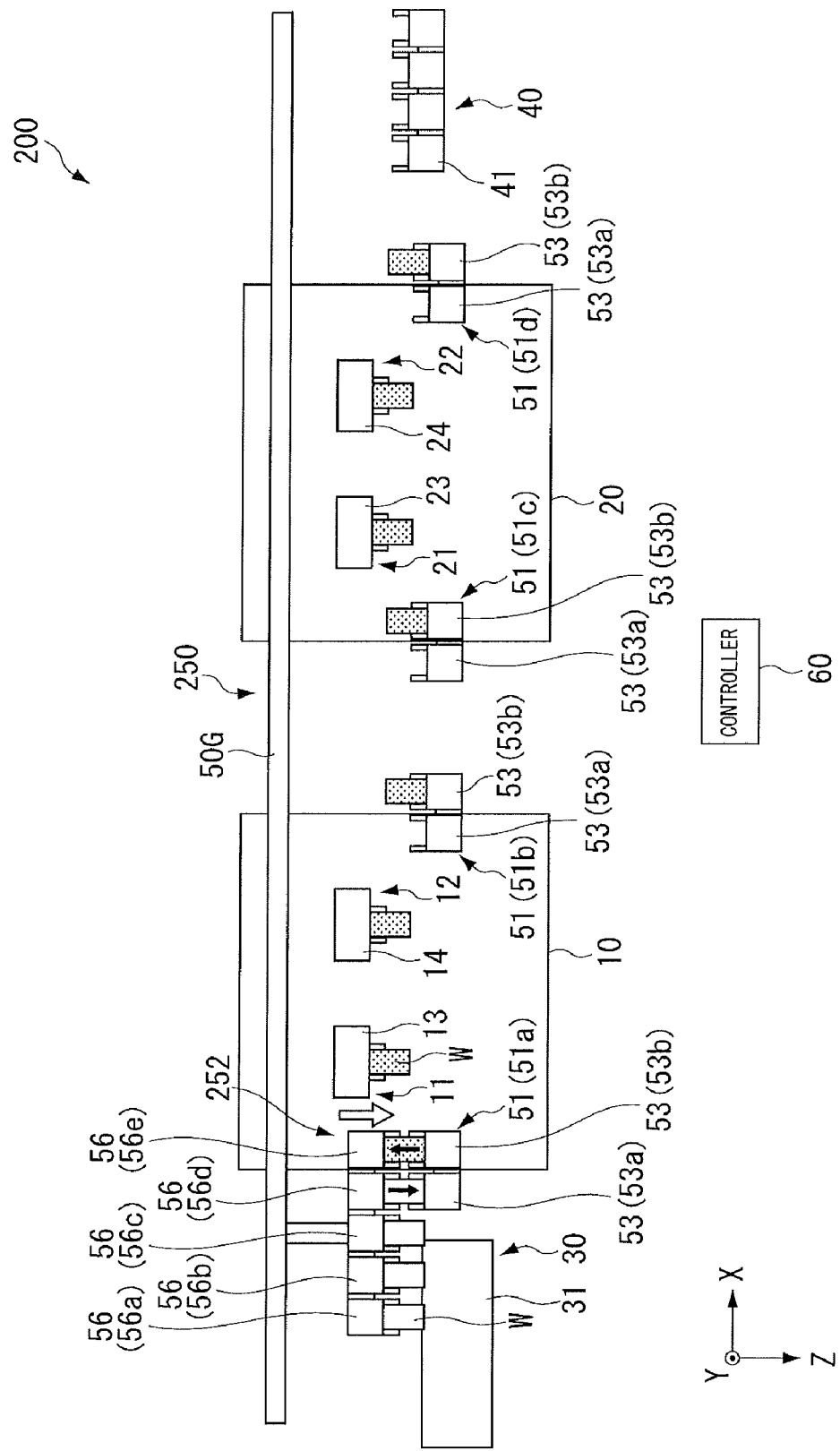
FIG. 13 is a diagram illustrating an example of an operation of the workpiece conveyance system, subsequently to FIG. 12.
Figure 14:
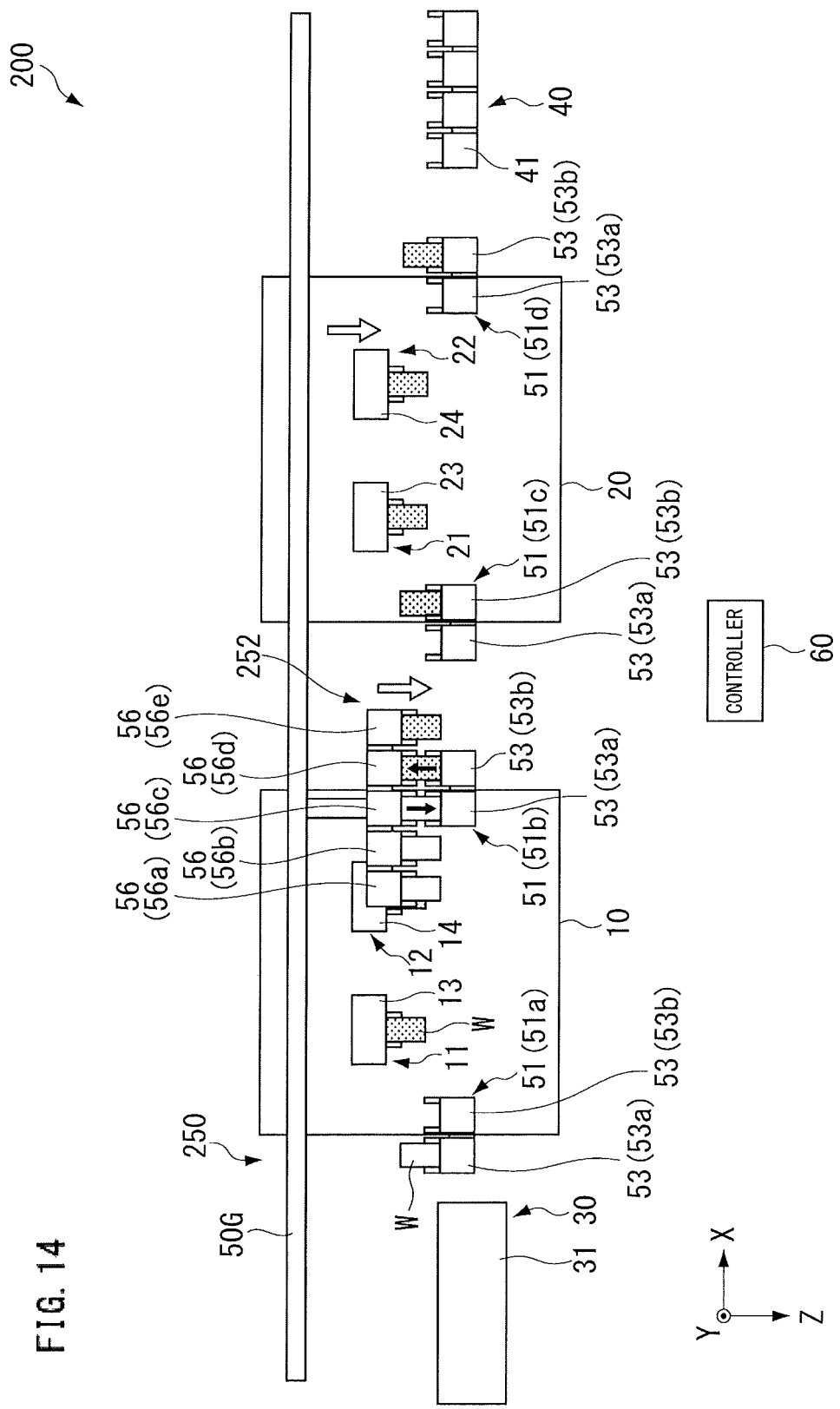
FIG. 14 is a diagram illustrating an example of an operation of the workpiece conveyance system, subsequently to FIG. 13.

Subsequently, the operation of the workpiece conveyance system 250 and the machine tool system 200 configured as described above will be described. FIG. 12 to FIG. 14 are diagrams illustrating an example of the operation of the machine tool system 200 including the workpiece conveyance system 250. In the following example, as in the first configuration, a description will be given for an operation from a state in which workpieces W are machined by the cutting tool T (see (A) in FIG. 5) in the spindle 11 and 12 of the first body 10 and the spindle 21 and 22 of the second body 20, and machined workpieces W are held on the relay loader chucks 53b of the relay loaders 51a to 51d corresponding to respective the spindles 11, 12, 21, and 22.

As illustrated in FIG. 12, the controller 60 allows the main loader chucks 56 of the main loader 252 to receive the four unmachined workpieces W placed on the carrying-in part 30. The receiving procedure of the workpieces W by each of the main loader chucks 56 is similar to that of the first configuration. The controller 60 allows the four main loader chucks 56a, 56b, 56c, and 56d of the five main loader chucks 56 of the main loader 252 to simultaneously receive the unmachined workpieces W. Consequently, the main loader chuck 56e is in an empty state.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chucks 53 of the relay loader 51a corresponding to the spindle 11 of the first body 10. As in the first configuration, after or before the main loader chucks 56 are reached, in a state in which the relay loader chuck 53b of the relay loader 51a holds the machined workpiece W received from the spindle 11 and the relay loader chuck 53a is empty, the controller 60 disposes the relay loader chucks 53 at the second position P2. The controller 60 allows the relay loader chuck 53a in the empty state in the relay loader 51b and the main loader chuck 56d holding the unmachined workpiece W in the main loader 252 to face each other. In such a state, the relay loader chuck 53b holding the machined workpiece W in the relay loader 51a and the main loader chuck 56e in the empty state in the main loader 252 are in a state of simultaneously facing each other.

Next, as illustrated in FIG. 13, the controller 60 moves the five main loader chucks 56 in the +Z direction to a position where the workpiece W can be received and delivered from/to the relay loader chucks 53. Subsequently, the controller 60 closes the main loader chuck 56e to hold the machined workpiece W and then releases the relay loader chuck 53b. As a consequence, the machined workpiece W is delivered from the relay loader chuck 53b to the main loader chuck 56e. Simultaneously or almost simultaneously, the controller 60 closes the relay loader chuck 53a to hold the unmachined workpiece W and then releases the main loader chuck 56d. As a consequence, the unmachined workpiece W is delivered from the main loader chuck 56d to the relay loader chuck 53a.

With the aforementioned operation, in the relay loader 51a, the relay loader chuck 53a holds the unmachined workpiece W and the relay loader chuck 53b is in an empty state. Furthermore, in the main loader 252, the main loader chuck 56e holds the machined workpiece W, the main loader chuck 56d is in an empty state, and the main loader chucks 56a to 56c maintain the state of holding the unmachined workpiece W as is.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chucks 53 of the relay loader 51b corresponding to the spindle 12 of the first body 10. In a manner similar to the first configuration, after or before the main loader chucks 56 are reached, in a state in which the relay loader chuck 53b of the relay loader 51b holds the machined workpiece W received from the spindle 12 and the relay loader chuck 53a is empty, the controller 60 disposes the relay loader chucks 53 at the second position P2. The controller 60 allows the relay loader chuck 53a in the empty state in the relay loader 51a and the main loader chuck 56c holding the unmachined workpiece W in the main loader 252 to face each other. In such a state, the relay loader chuck 53b holding the machined workpiece W in the relay loader 51b and the main loader chuck 56d in an empty state in the main loader 252 are in a state of simultaneously facing each other.

Next, as illustrated in FIG. 14, the controller 60 moves the five main loader chucks 56 in the +Z direction to a position where the workpiece W can be received from and delivered to the relay loader chucks 53. Subsequently, the controller 60 closes the main loader chuck 56d to hold the machined workpiece W and then releases the relay loader chuck 53b. As a consequence, the machined workpiece W is delivered from the relay loader chuck 53b to the main loader chuck 56d. Simultaneously or almost simultaneously, the controller 60 closes the relay loader chuck 53a to hold the unmachined workpiece W and then releases the main loader chuck 56c. As a consequence, the unmachined workpiece W is delivered from the main loader chuck 56c to the relay loader chuck 53a.

With the aforementioned operation, in the relay loader 51b, the relay loader chuck 53a holds the unmachined workpiece W and the relay loader chuck 53b is in an empty state. Furthermore, in the main loader 252, the main loader chucks 56d and 56e hold the machined workpieces W, the main loader chuck 56c is in an empty state, and the main loader chucks 56a and 56b maintain the state of holding the unmachined workpieces W as is. Although not illustrated in the second configuration, the receiving and delivery of the workpieces W between the relay loader chuck 53 and the spindle chuck 13 is similar to the operation of the aforementioned relay loaders 51a illustrated in FIGS. 8 and 9.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chucks 53 of the relay loader 51c corresponding to the spindle 21 of the second body 20. In a manner similar to the first configuration, after or before the main loader chucks 56 are reached, in a state in which the relay loader chuck 53b of the relay loader 51c holds the machined workpiece W received from the spindle 21 and the relay loader chuck 53a is empty, the controller 60 disposes the relay loader chucks 53 at the second position P2. The controller 60 allows the relay loader chuck 53a in the empty state in the relay loader 51c and the main loader chuck 56b holding the unmachined workpiece W in the main loader 252 to face each other. In such a state, the relay loader chuck 53b holding the machined workpiece W in the relay loader 51c and the main loader chuck 56c in the empty state in the main loader 252 are in a state of simultaneously facing each other.

Figure 15:
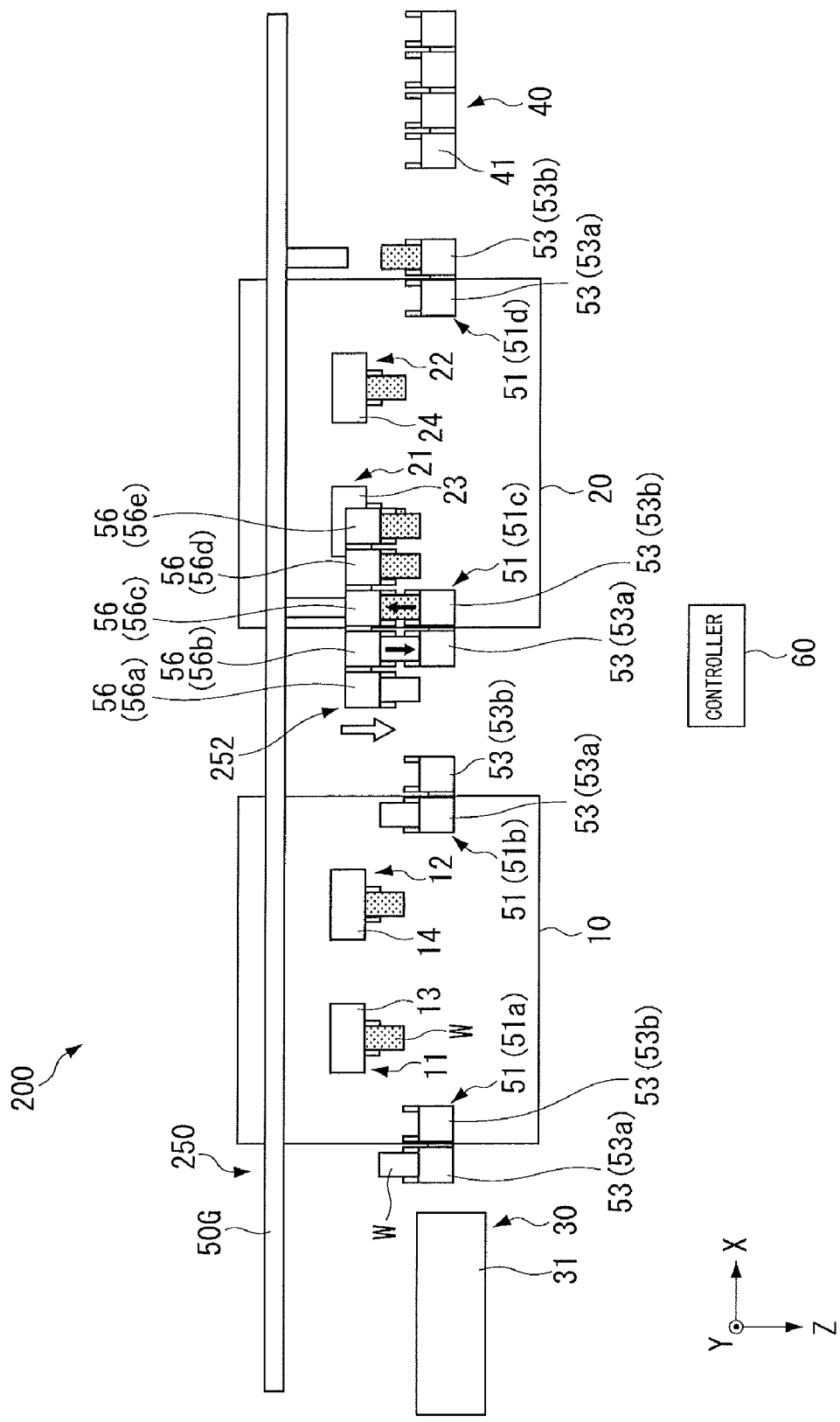
FIG. 15 is a diagram illustrating an example of an operation of the workpiece conveyance system, subsequently to FIG. 14.

Next, as illustrated in FIG. 15, the controller 60 moves the five main loader chucks 56 in the +Z direction to a position where the workpiece W can be received from and delivered to the relay loader chucks 53. Subsequently, the controller 60 closes the main loader chuck 56c to hold the machined workpiece W and then releases the relay loader chuck 53b. As a consequence, the machined workpiece W is delivered from the relay loader chuck 53b to the main loader chuck 56c. Simultaneously or almost simultaneously, the controller 60 closes the relay loader chuck 53a to hold the unmachined workpiece W and then releases the main loader chuck 56b. As a consequence, the unmachined workpiece W is delivered from the main loader chuck 56b to the relay loader chuck 53a.

With the aforementioned operation, in the relay loader 51c, the relay loader chuck 53a holds the unmachined workpiece W and the relay loader chuck 53b is in an empty state. Furthermore, in the main loader 252, the main loader chucks 56c to 56e hold the machined workpieces W, the main loader chuck 56b is in an empty state, and the main loader chuck 56a maintains the state of holding the unmachined workpiece W as is.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chucks 53 of the relay loader 51d corresponding to the spindle 22 of the second body 20. In a manner similar to the first configuration, after or before the main loader chucks 56 are reached, in a state in which the relay loader chuck 53b of the relay loader 51d holds the machined workpiece W received from the spindle 21 and the relay loader chuck 53a is empty, the controller 60 disposes the relay loader chucks 53 at the second position P2. The controller 60 allows the relay loader chuck 53a in the empty state in the relay loader 51d and the main loader chuck 56a holding the unmachined workpiece W in the main loader 252 to face each other. In such a state, the relay loader chuck 53b holding the machined workpiece W in the relay loader 51d and the main loader chuck 56b in the empty state in the main loader 252 are in a state of simultaneously facing each other.

Figure 16:
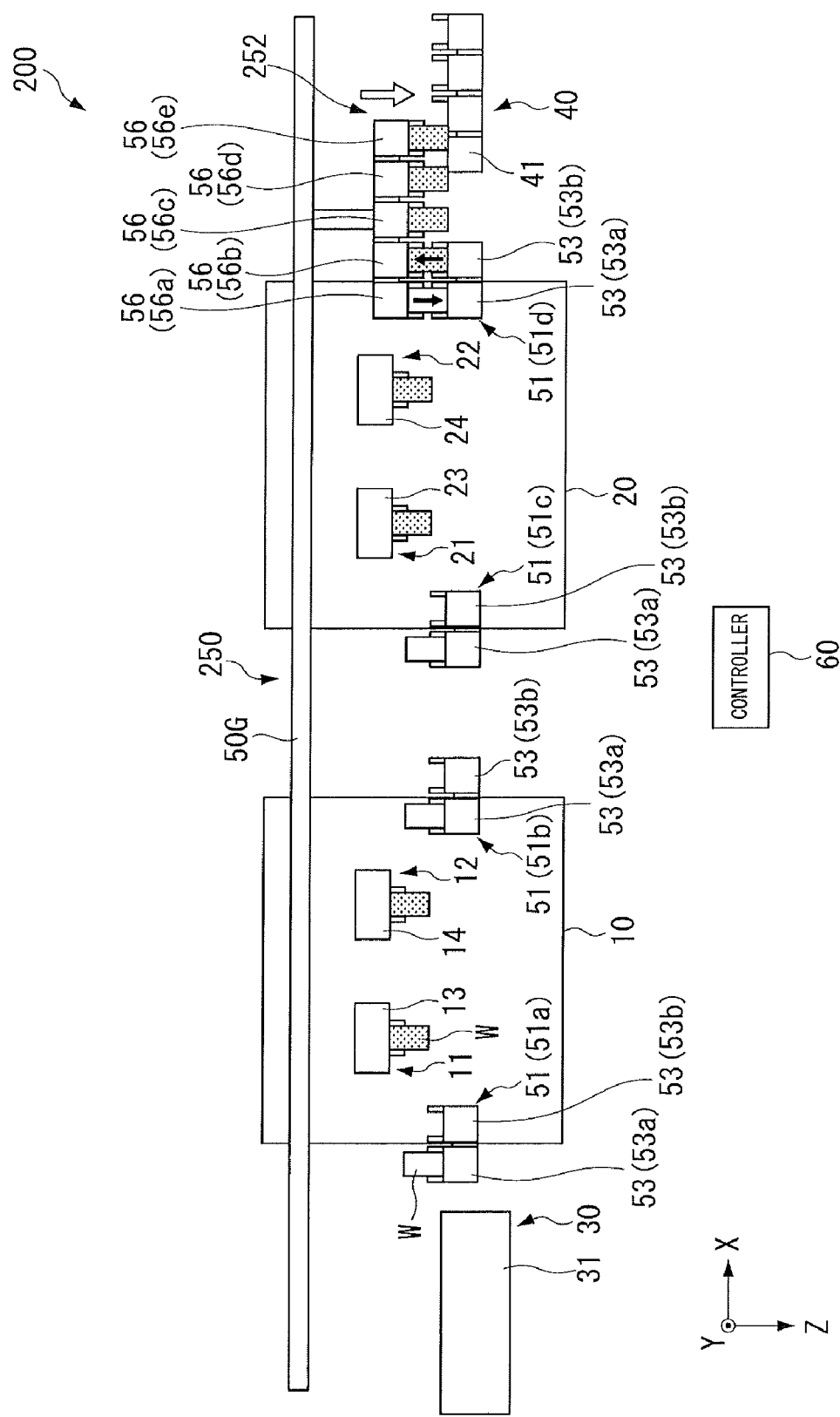
FIG. 16 is a diagram illustrating an example of an operation of the workpiece conveyance system, subsequently to FIG. 15.

Next, as illustrated in FIG. 16, the controller 60 moves the five main loader chucks 56 in the +Z direction to a position where the workpiece W can be received from and delivered to the relay loader chucks 53. Subsequently, the controller 60 closes the main loader chuck 56b to hold the machined workpiece W and then releases the relay loader chuck 53b. As a consequence, the machined workpiece W is delivered from the relay loader chuck 53b to the main loader chuck 56b. Simultaneously or almost simultaneously, the controller 60 closes the relay loader chuck 53a to hold the unmachined workpiece W and then releases the main loader chuck 56a. As a consequence, the unmachined workpiece W is delivered from the main loader chuck 56a to the relay loader chuck 53a.

With the aforementioned operation, in the relay loader 51d, the relay loader chuck 53a holds the unmachined workpiece W and the relay loader chuck 53b is in an empty state. Furthermore, in the main loader 252, the main loader chucks 56b to 56e hold the machined workpieces W and the main loader chuck 56a is in an empty state.

Figure 17:
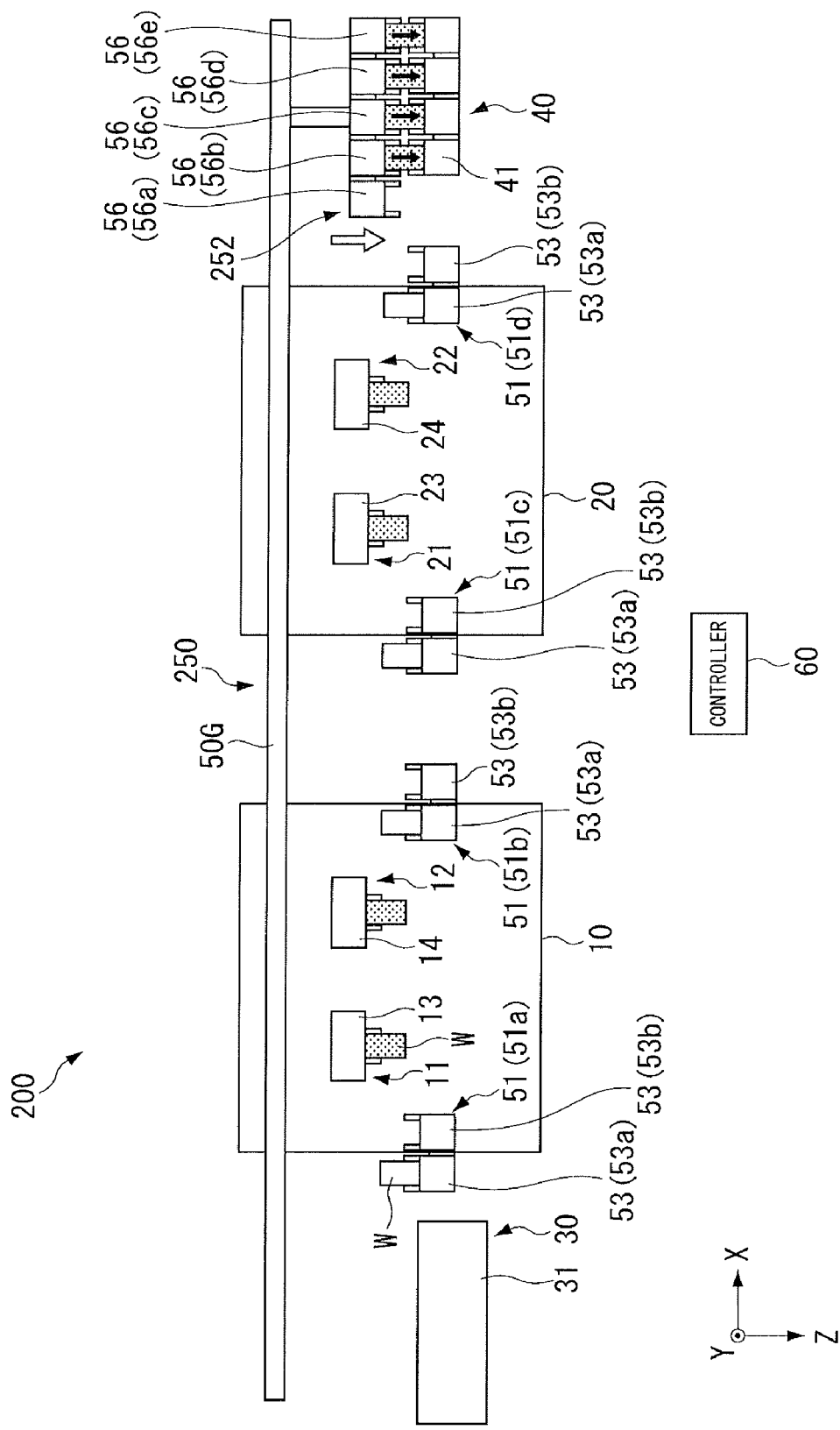
FIG. 17 is a diagram illustrating an example of an operation of the workpiece conveyance system, subsequently to FIG. 16.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the carrying-out chucks 41 of the carrying-out part 40. Next, as illustrated in FIG. 17, the controller 60 moves the five main loader chucks 56 in the +Z direction to a position where the workpieces W can be received from and delivered to the carrying-out chucks 41. Subsequently, the controller 60 allows each carrying-out chuck 41 to hold the machined workpiece W and then releases the main loader chucks 56b to 56e. As a consequence, the four machined workpieces W are simultaneously or almost simultaneously delivered from the main loader chucks 56b to 56e to the carrying-out chucks 41, respectively. With such an operation, in the main loader 252, the five main loader chucks 56 are in an empty state, move along the guide 50G in the −X direction, and return to the carrying-in part 30 so that four unmachined workpieces W can be held by the main loader chucks 56 as illustrated in FIG. 12.

As described above, while the main loader 252 moves once in the +X direction from the carrying-in part 30 to the carrying-out part 40, the main loader 252 continuously receives and delivers workpieces W from/to the four relay loaders 51a to 51d disposed in the first body 10 and the second body 20. That is, by one-time movement in the +X direction, the main loader 252 conveys four unmachined workpieces W on the carrying-in part 30 to the relay loaders 51a to 51d, respectively, receives machined workpieces W from the relay loaders 51a to 51d, and conveys the machined workpieces W to the carrying-out part 40. In this example, the receiving and delivery operation of the workpieces W by the main loader chucks 56 is repeated four times (n=4) for the spindles 11, 12, 21, and 22.

As described above, according to this example, since unmachined workpieces W are supplied to the spindles 11, 12, 21, and 22, and machined workpieces W are collected, while the main loader 252 reaches the carrying-out part 40 from the carrying-in part 30, a time required for receiving and delivering the workpieces W is shortened, and the efficiency in conveying the workpieces W can be improved. In the aforementioned example, five (=1+four spindles 11, 12, 21, and 22) main loader chucks 56 are used. However, this example is not limited to this configuration and, for example, six or more main loader chucks 56 may be provided for four spindles because it is sufficient if the number of main loader chucks 56 is the number of spindles+ m.

Third Configuration

Figure 18:
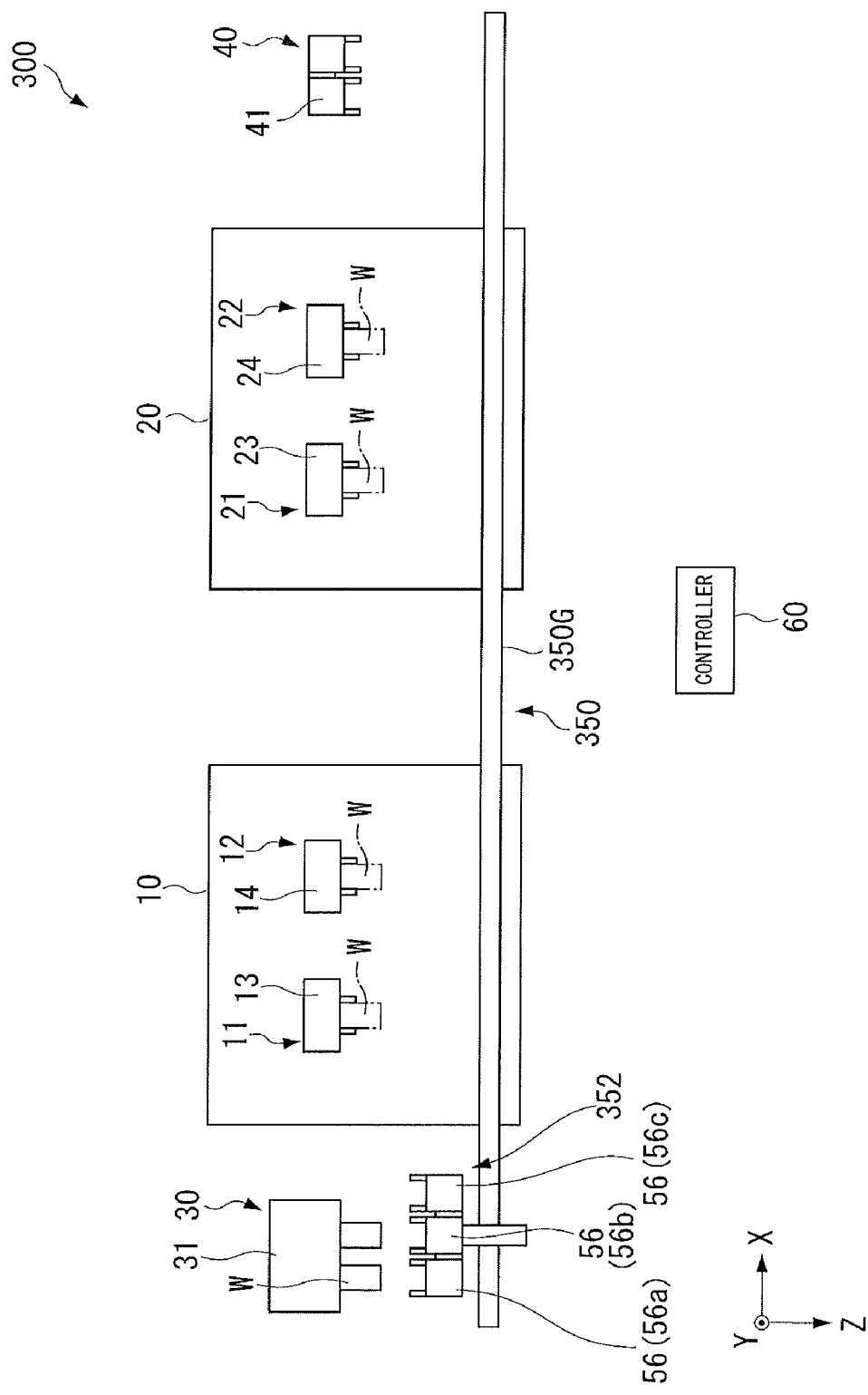
FIG. 18 is a diagram illustrating an example of a workpiece conveyance system and a machine tool system according to a third configuration.

A third configuration will be described with reference to the drawings. FIG. 18 is a diagram illustrating an example of a workpiece conveyance system 350 and a machine tool system 300 according to the third configuration. As illustrated in FIG. 18, the machine tool system 300 includes the first body (machine tool body) 10, the second body (machine tool body) 20, the carrying-in part 30, the carrying-out part 40, the workpiece conveyance system 350, and the controller 60. In the third configuration, the configuration of the workpiece conveyance system 350 is different from that of the first configuration and the other configurations are similar to those of the first configuration. In the following description, the same or equivalent components as those of the first configuration are denoted by the same reference numerals and a description thereof will be omitted or simplified.

The workpiece conveyance system 350 includes a main loader 352 but includes no relay loader. In the third configuration, as in the first configuration, a description will be given in which n, which is the number of spindles 11 and 12 of the first body 10, is set to 2. The main loader 352 is movable along a guide 350G in the X direction. The guide 350G is different from the guide 50G of the first configuration, and is disposed along the X direction on the +Z side of the first body 10 and the second body 20.

The main loader chucks 56 have a configuration similar to that illustrated in the first configuration, except that the main loader chucks 56 are disposed to face the spindle chuck 13 or the like. Similar to the guide 50G of the first configuration, the guide 350G may be disposed on the −Z side of the first body 10 and the second body 20. The main loader 352 may be provided with a structure that allows the main loader chucks 56 to face the spindle chuck 13 or the like. Furthermore, the carrying-in part 30 is similar to the first configuration, except that the carrying-in part 30 holds unmachined workpieces W in the +Z direction.

Subsequently, the operation of the workpiece conveyance system 350 and the machine tool system 300 configured as described above will be described. FIG. 19 to FIG. 24 are diagrams illustrating an example of the operation of the machine tool system 300 including the workpiece conveyance system 350. In the following example, as in the first configuration, a description will be given for an operation from a state in which workpieces W are machined by the cutting tool T (see (A) in FIG. 5) in the spindles 11 and 12 of the first body 10 and the spindles 21 and 22 of the second body 20, and machined workpieces W are held on the spindles 11, 12, 21, and 22, respectively.

Figure 19:
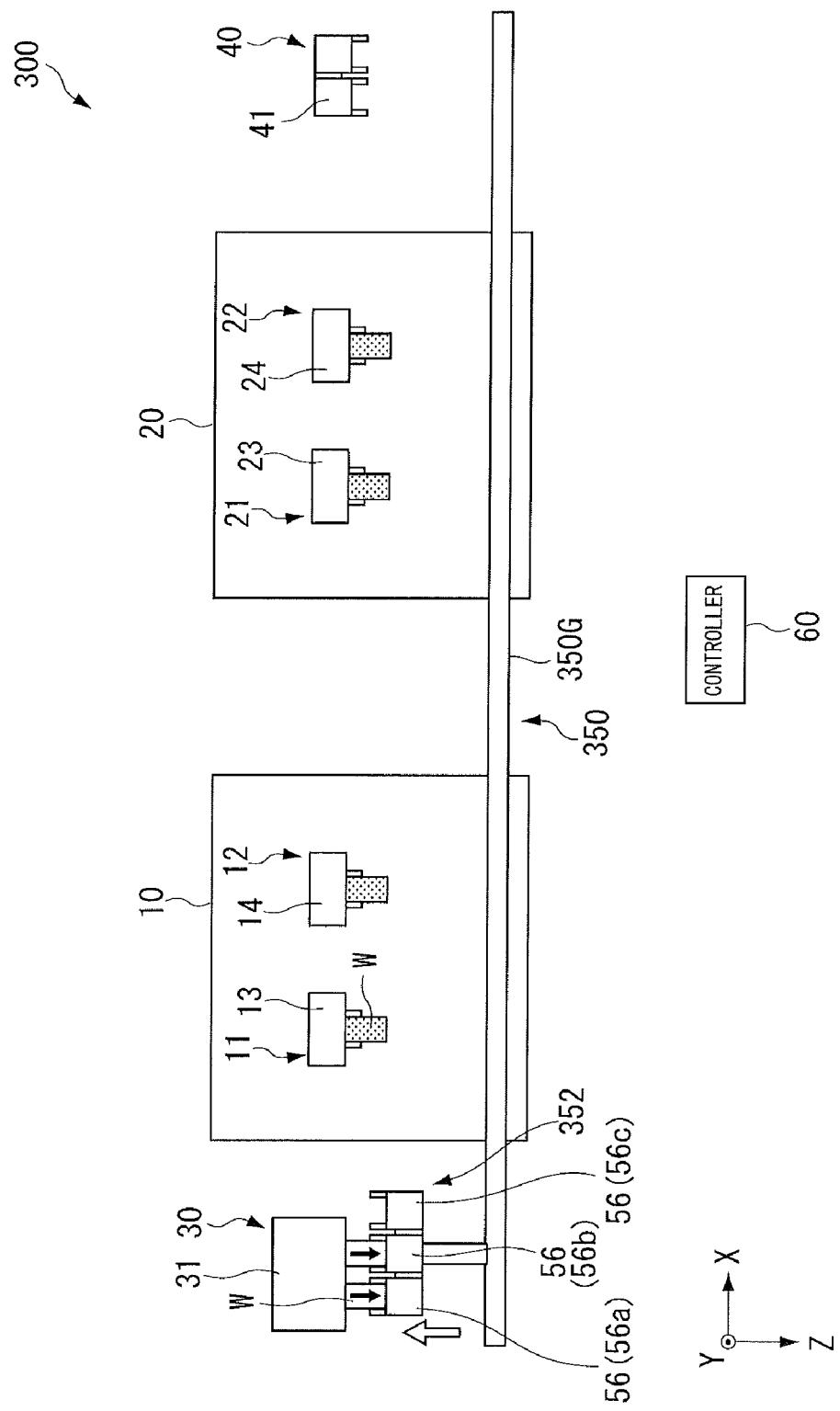
FIG. 19 is a diagram illustrating an example of an operation of the workpiece conveyance system, subsequently to FIG. 18.

As illustrated in FIG. 19, the controller 60 moves the main loader chucks 56 in the −Z direction and allows the main loader chucks 56 of the main loader 352 to receive two unmachined workpiece W placed on the carrying-in part 30. The receiving procedure of the workpieces W by each of the main loader chucks 56 is similar to that of the first configuration. The controller 60 allows the two main loader chucks 56a and 56b of the three main loader chucks 56 of the main loader 352 to simultaneously receive the unmachined workpieces W. Consequently, the main loader chuck 56c is in an empty state.

Figure 20:
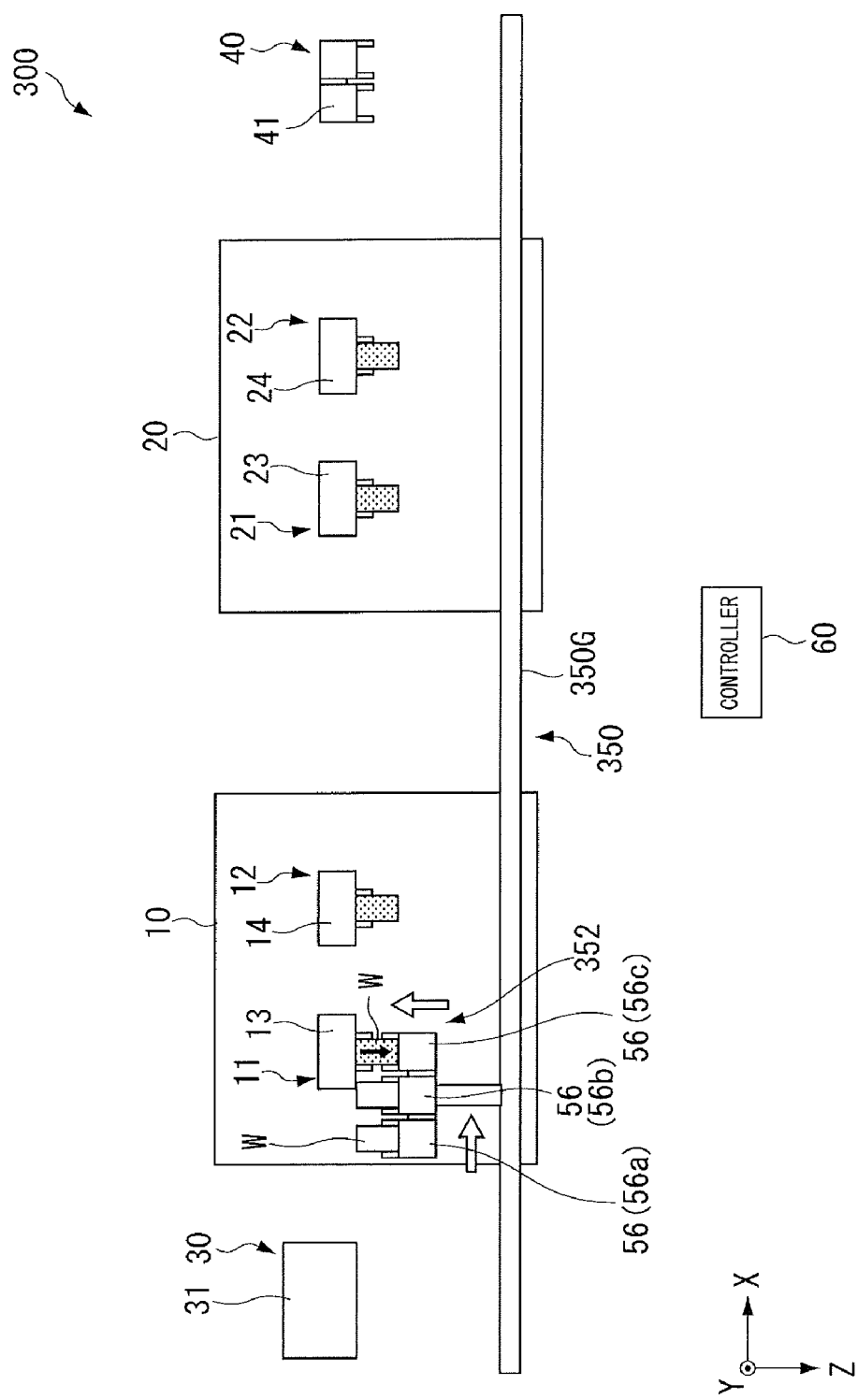
FIG. 20 is a diagram illustrating an example of an operation of the workpiece conveyance system, subsequently to FIG. 19.

Next, the controller 60 moves back the main loader chucks 56 in the +Z direction, then moves the main loader chucks 56 along the guide 350G in the +X direction, and disposes the main loader chuck 56c of the main loader chucks 56 at a position where the main loader chuck 56c can face the spindle chuck 13 of the spindle 11. Next, as illustrated in FIG. 20, the controller 60 moves the three main loader chucks 56 in the −Z direction to a position where the workpiece W can be received from and delivered to the spindle chuck 13. Subsequently, the controller 60 closes the main loader chuck 56c to hold the machined workpiece W and then releases the spindle chuck 13. As a consequence, the machined workpiece W is delivered from the spindle chuck 13 to the main loader chuck 56c.

Figure 21:
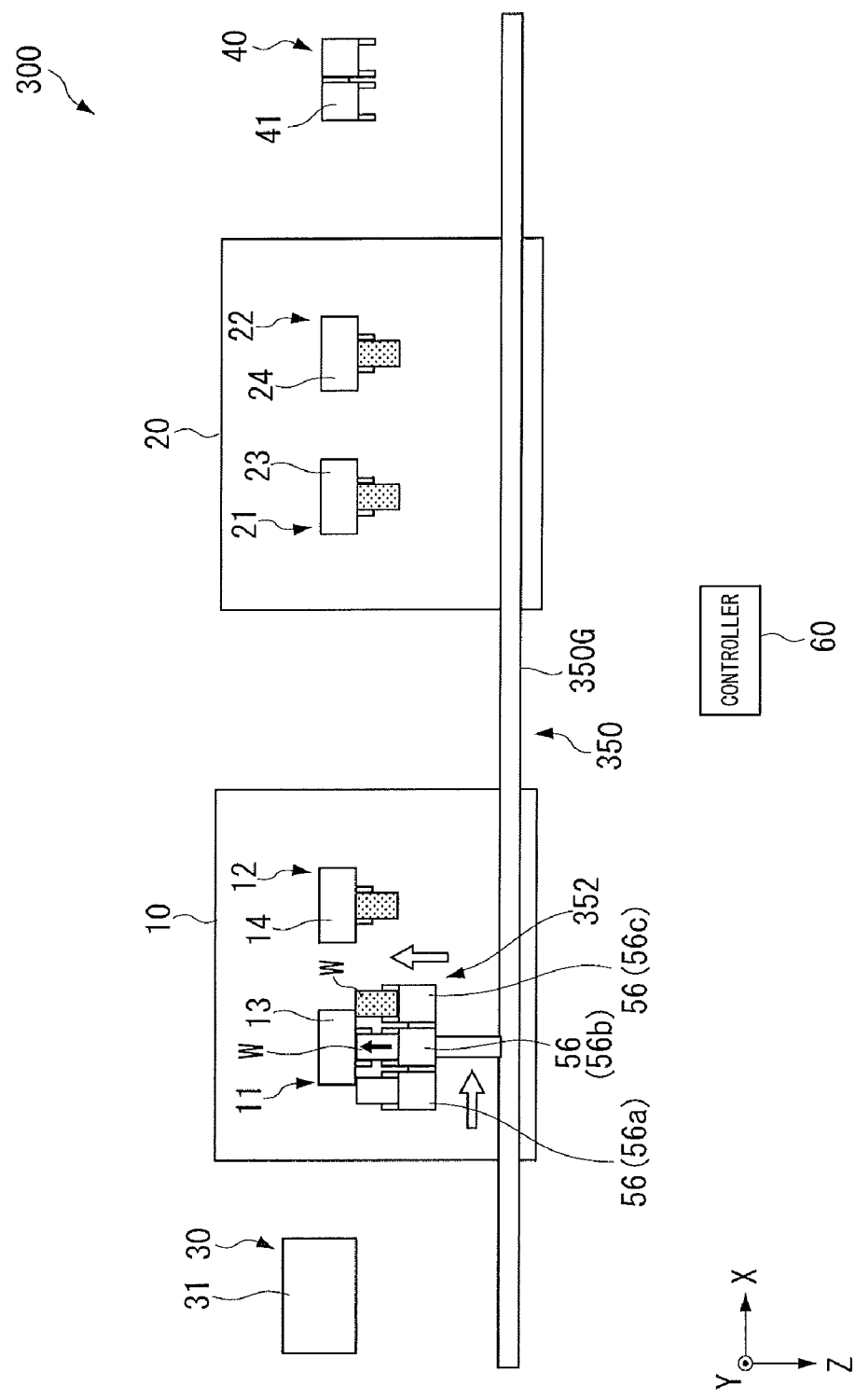
FIG. 21 is a diagram illustrating an example of an operation of the workpiece conveyance system, subsequently to FIG. 20.

Next, the controller 60 moves back the main loader chucks 56 in the +Z direction, then moves the main loader chucks 56 along the guide 350G in the +X direction, and then disposes the main loader chuck 56b holding the unmachined workpiece W among the main loader chucks 56 at a position where the main loader chuck 56b can face the spindle chuck 13 of the spindle 11. Next, as illustrated in FIG. 21, the controller 60 moves the three main loader chucks 56 in the −Z direction to a position where the workpiece W can be received from and delivered to the spindle chuck 13. Subsequently, the controller 60 closes the main shaft chuck 13 to hold the unmachined workpiece W and then releases the main loader chuck 56b. As a consequence, the unmachined workpiece W is delivered from the main loader chuck 56b to the spindle chuck 13.

With the aforementioned operation, in the main loader 352, the main loader chuck 56c holds the machined workpiece W, the main loader chuck 56b is in an empty state, and the main loader chuck 56a maintains the state of holding the unmachined workpiece W as is.

Figure 22:
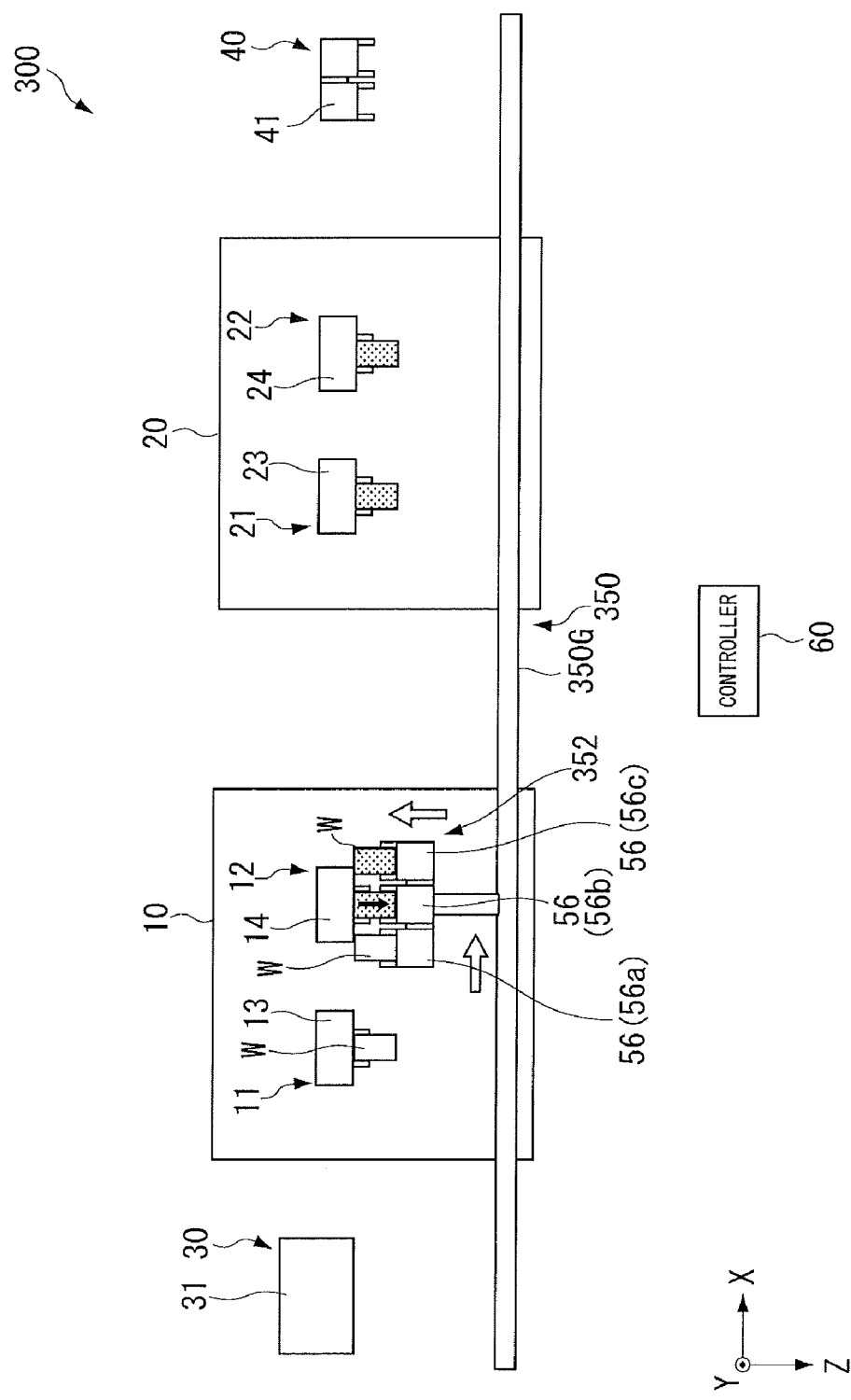
FIG. 22 is a diagram illustrating an example of an operation of the workpiece conveyance system, subsequently to FIG. 21.

Next, the controller 60 moves back the main loader chucks 56 in the +Z direction, then moves the main loader chucks 56 along the guide 350G in the +X direction, and disposes the main loader chuck 56b of the main loader chucks 56 at a position where the main loader chuck 56b can face the main spindle 14 of the spindle 12. Next, as illustrated in FIG. 22, the controller 60 moves the three main loader chucks 56 in the −Z direction to a position where the workpiece W can be received from and delivered to the spindle chuck 14. Subsequently, the controller 60 closes the main loader chuck 56b to hold the machined workpiece W and then releases the spindle chuck 14. As a consequence, the machined workpiece W is delivered from the main shaft chuck 14 to the main loader chuck 56b.

Figure 23:
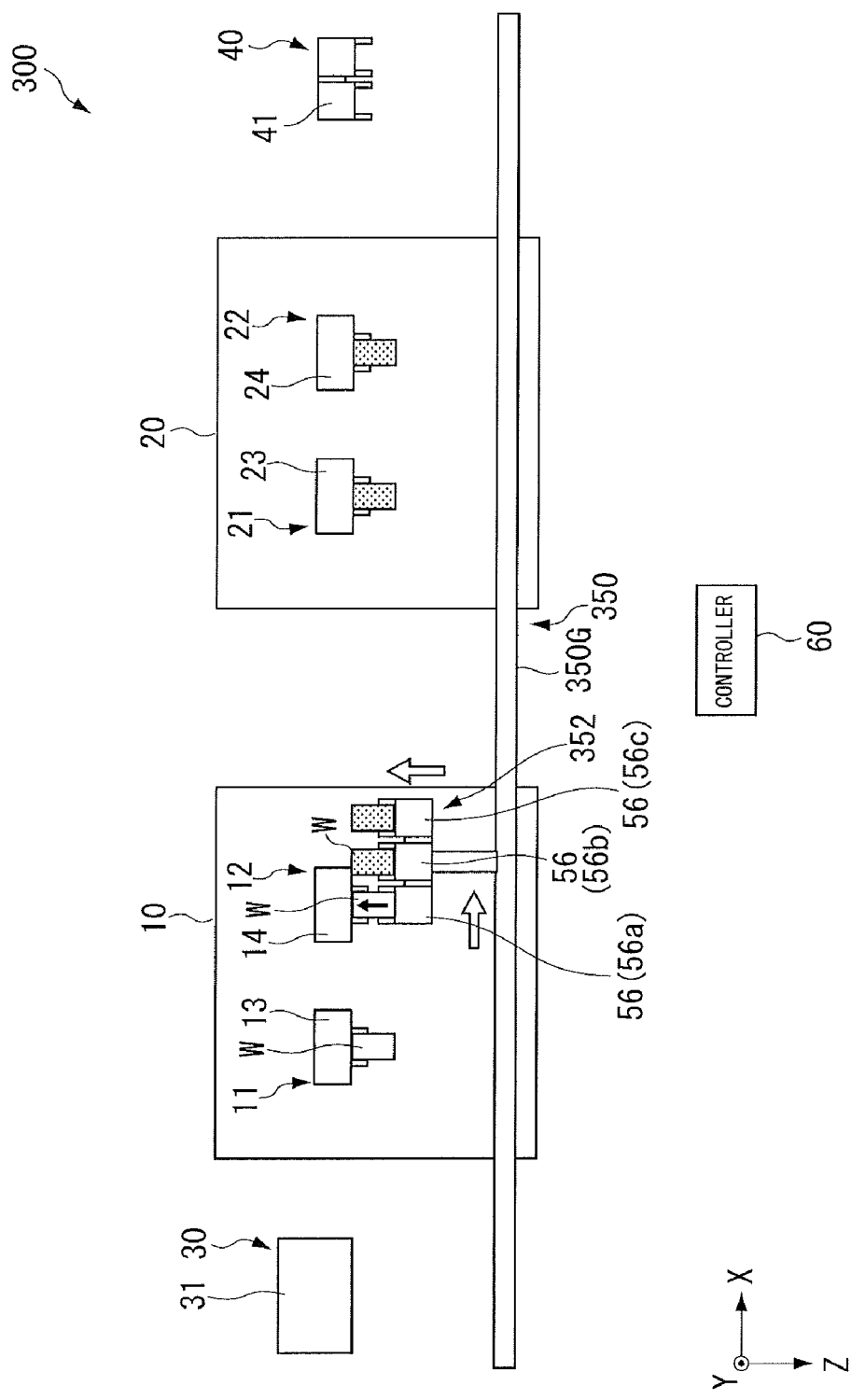
FIG. 23 is a diagram illustrating an example of an operation of the workpiece conveyance system, subsequently to FIG. 22.

Next, the controller 60 moves back the main loader chucks 56 in the +Z direction, then moves the main loader chucks 56 along the guide 350G in the +X direction, and disposes the main loader chuck 56a holding the unmachined workpiece W among the main loader chucks 56 at a position where the main loader chuck 56a can face the spindle chuck 14 of the spindle 12. Next, as illustrated in FIG. 23, the controller 60 moves the three main loader chucks 56 in the −Z direction to a position where the workpiece W can be received from and delivered to the spindle chuck 14. Subsequently, the controller 60 closes the spindle chuck 14 to hold the unmachined workpiece W and then releases the main loader chuck 56a. As a consequence, the unmachined workpiece W is delivered from the main loader chuck 56a to the spindle chuck 14.

With the aforementioned operation, in the main loader 352, the main loader chucks 56b and 56c hold the machined workpiece W and the main loader chuck 56a is in an empty state. Next, the controller 60 moves back the main loader chucks 56 in the +Z direction, then moves the main loader chucks 56 along the guide 350G in the +X direction, and disposes the main loader chucks 56 at a position where the main loader chucks 56 can face the carrying-out chucks 41 of the carrying-out part 40.

Figure 24:
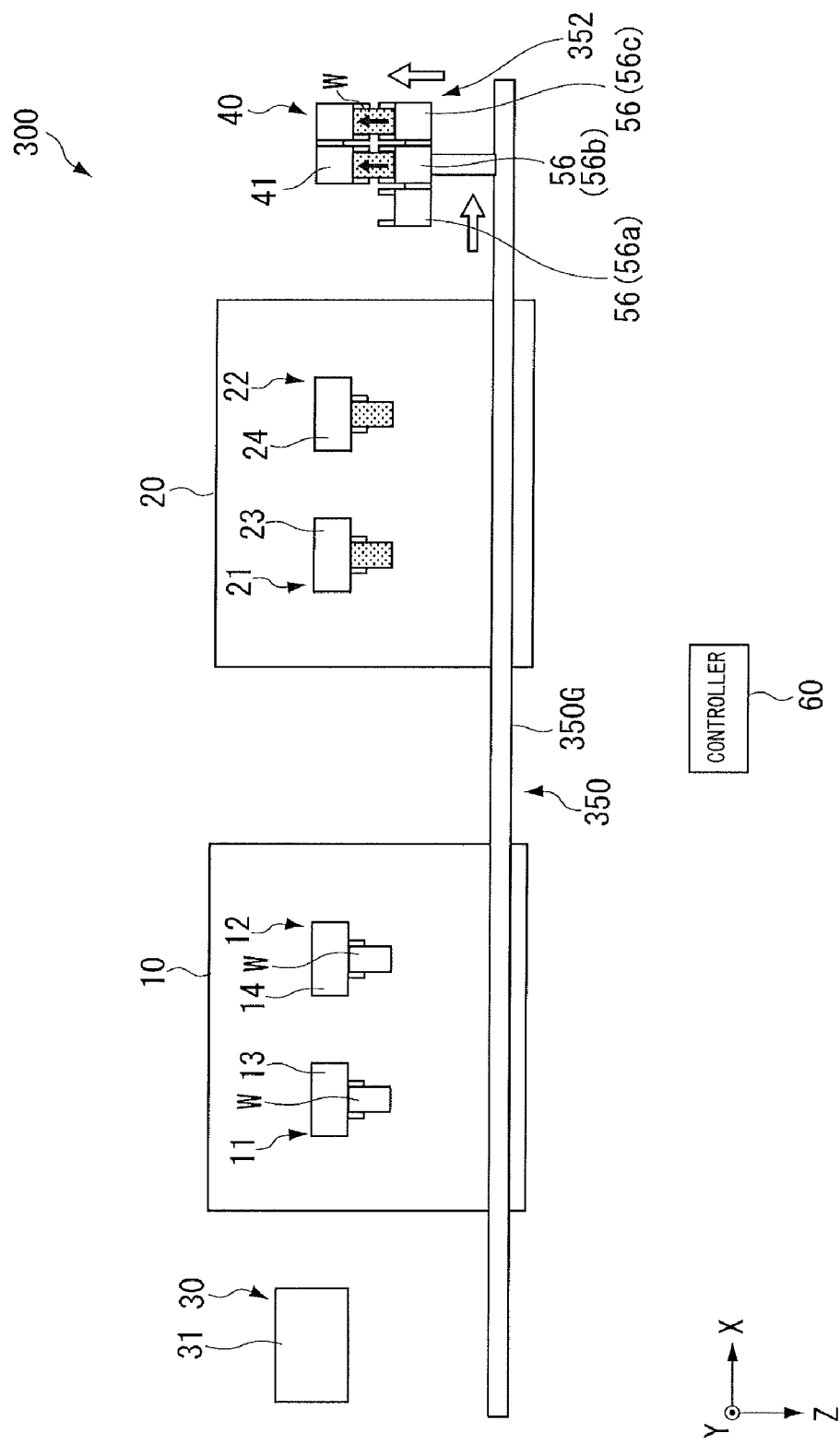
FIG. 24 is a diagram illustrating an example of an operation of the workpiece conveyance system, subsequently to FIG. 23.

Next, as illustrated in FIG. 24, the controller 60 moves back the three main loader chucks 56 in the −Z direction to a position where the workpieces W can be received from and delivered to the carrying-out chucks 41. Subsequently, the controller 60 allows each carrying-out chuck 41 to hold the machined workpiece W and then releases the main loader chucks 56b and 56c. As a consequence, the two machined workpieces W are simultaneously or almost simultaneously delivered from the main loader chucks 56b and 56c to the carrying-out chucks 41, respectively. With such an operation, in the main loader 352, the three main loader chucks 56 are in an empty state, move along the guide 350G in the −X direction, and return to the carrying-in part 30 so that two unmachined workpieces W can be held by the main loader chucks 56 as illustrated in FIG. 19.

As described above, while the main loader 352 moves once in the +X direction from the carrying-in part 30 to the carrying-out part 40, the main loader 352 continuously receives and delivers workpieces W from/to the two spindle chucks 13 and 14 disposed in the first body 10. That is, by one-time movement in the +X direction, the main loader 352 conveys two unmachined workpieces W on the carrying-in part 30 to the spindle chucks 13 and 14, respectively, receives machined workpieces W from the spindle chucks 13 and 14, and conveys the machined workpieces W to the carrying-out part 40.

Next, in a manner similar to the illustration in FIG. 19, the main loader chucks 56 hold two unmachined workpieces W on the carrying-in part 30, move along the guide 350G in the +X direction, receive a machined workpiece W from the spindle chuck 23 of the spindle 21 of the second body 20, and deliver the unmachined workpiece W. The receiving and delivery operation of the workpieces W is similar to the operations in FIGS. 20 and 21. Next, the main loader chucks 56 move along the guide 350G in the +X direction, receive a machined workpiece W from the spindle chuck 24 of the spindle 22 of the second body 20, and deliver the unmachined workpiece W. The receiving and delivery operation of the workpieces W is similar to the operations in FIGS. 22 and 23. Next, the main loader chucks 56 move along the guide 350G in the +X direction and deliver the machined workpieces W to the carrying-out chucks 41 of the carrying-out part 40.

In the main loader 352, the main loader chucks 56 are in an empty state and return to the carrying-in part 30 so that the main loader chucks 56 can hold two unmachined workpieces W as illustrated in FIG. 19. Such an operation is repeated so that unmachined workpieces W are continuously supplied to the spindles 11 and 12 of the first body 10 and the spindles 21 and 22 of the second body 20 and machined workpieces W are continuously collected. In this example, the receiving and delivery operation of the workpieces W by the main loader chucks 56 is repeated twice (n=2) for the spindles 11 and 12 or the spindles 21 and 22, respectively.

As described above, according to this example, since unmachined workpieces W are supplied to the spindles 11 and 12 or the spindles 21 and 22, and machined workpieces W are collected, while the main loader 352 reaches the carrying-out part 40 from the carrying-in part 30, a time required to receive and deliver the workpieces W is shortened, and the efficiency in conveying the workpieces W can be improved. Furthermore, according to this example, it is possible to reduce the equipment cost because no relay loader is used. In the aforementioned example, three (which is equal to the number of spindles 11 and 12 (n=2) plus one) main loader chucks 56 are used. However, four or more main loader chucks 56 may be used. Furthermore, as in the second configuration, five (=1+four spindles 11, 12, 21, and 22) main loader chucks 56 may also be used. The receiving and delivery operation of the workpieces W by the main loader chucks 56 may be repeated four times (n=4) for the spindle 11 or the like.

Fourth Configuration

Figure 25:
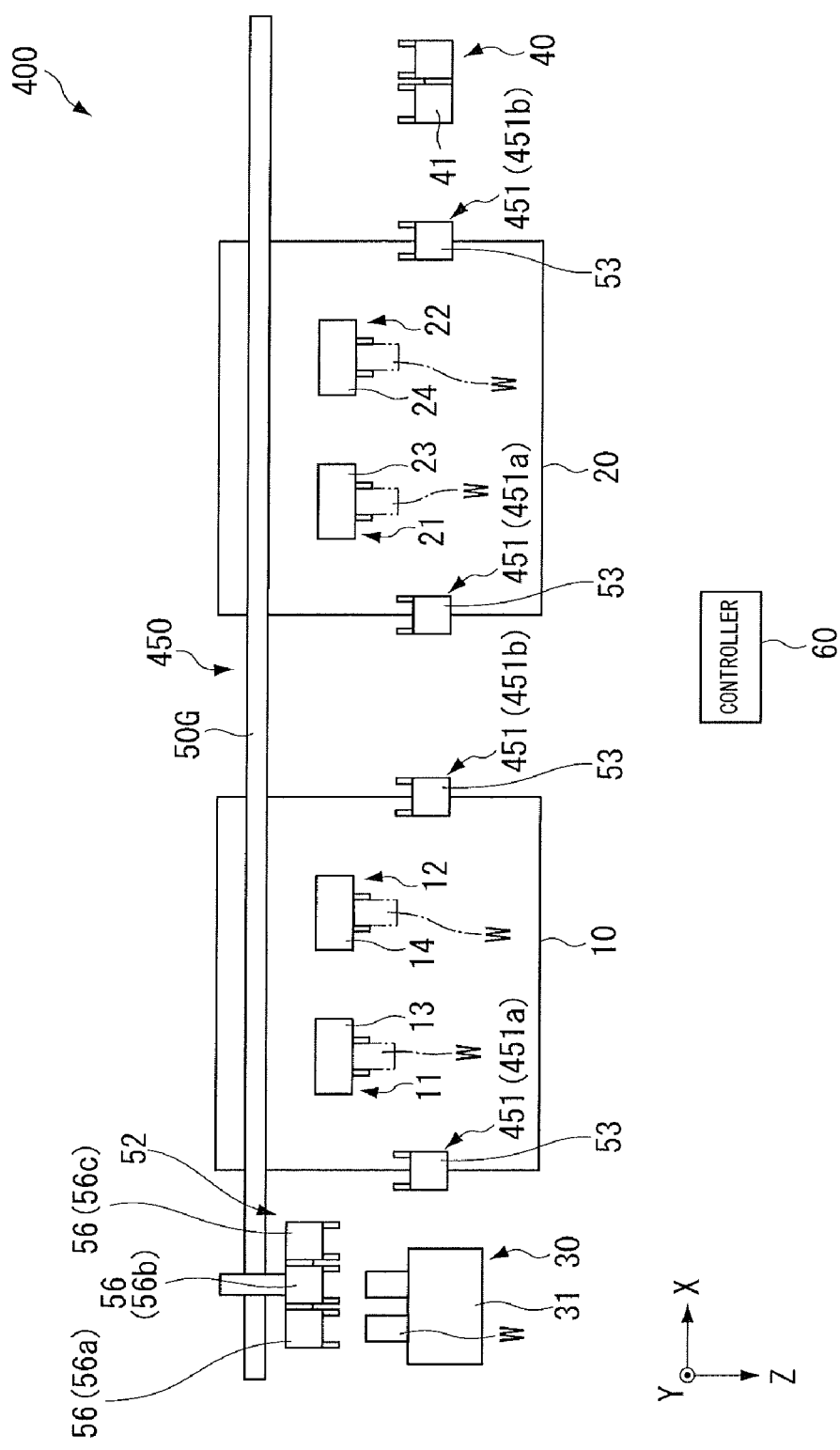
FIG. 25 is a diagram illustrating an example of a workpiece conveyance system and a machine tool system according to a fourth configuration.

A fourth configuration will be described with reference to the drawings. FIG. 25 is a diagram illustrating an example of a workpiece conveyance system 450 and a machine tool system 400 according to the fourth configuration. As illustrated in FIG. 25, the machine tool system 400 includes the first body (machine tool body) 10, the second body (machine tool body) 20, the carrying-in part 30, the carrying-out part 40, the workpiece conveyance system 450, and the controller 60. In the fourth configuration, the configuration of the workpiece conveyance system 450 is different from that of the first configuration and the other configurations are similar to those of the first configuration. In the following description, the same or equivalent components as those of the first configuration are denoted by the same reference numerals and a description thereof will be omitted or simplified.

The workpiece conveyance system 450 has relay loaders 451 and a main loader 52. In the relay loader 451, one relay loader chuck 53 is provided to the turning plate 55 (see FIG. 5). That is, the spindle shaft chuck 13 or the like of the spindle 11 or the like and the relay loader chucks 53 of each relay loader 451 correspond to each other in a one-to-one manner. Similar to the relay loader 51 of the first configuration, the relay loader 451 can move the relay loader chuck 53 to the first position P1, where the relay loader chuck 53 faces the spindle chuck 13 or the like, and the second position P2, where the relay loader chuck 53 faces the main loader chuck 56 of the main loader 52, by turning the turning plate 55. The main loader 52 has a configuration similar to that of the first configuration.

Subsequently, the operation of the workpiece conveyance system 450 and the machine tool system 400 configured as described above will be described. FIG. 26 to FIG. 31 are diagrams illustrating an example of the operation of the machine tool system 400 including the workpiece conveyance system 450. In the following example, as in the first configuration, a description will be given for an operation from a state in which workpieces W are machined by the cutting tool T (see (A) in FIG. 5) in the spindles 11 and 12 of the first body 10 and the spindles 21 and 22 of the second body 20, and machined workpieces W are held on the spindles 11, 12, 21, and 22, respectively.

Figure 26:
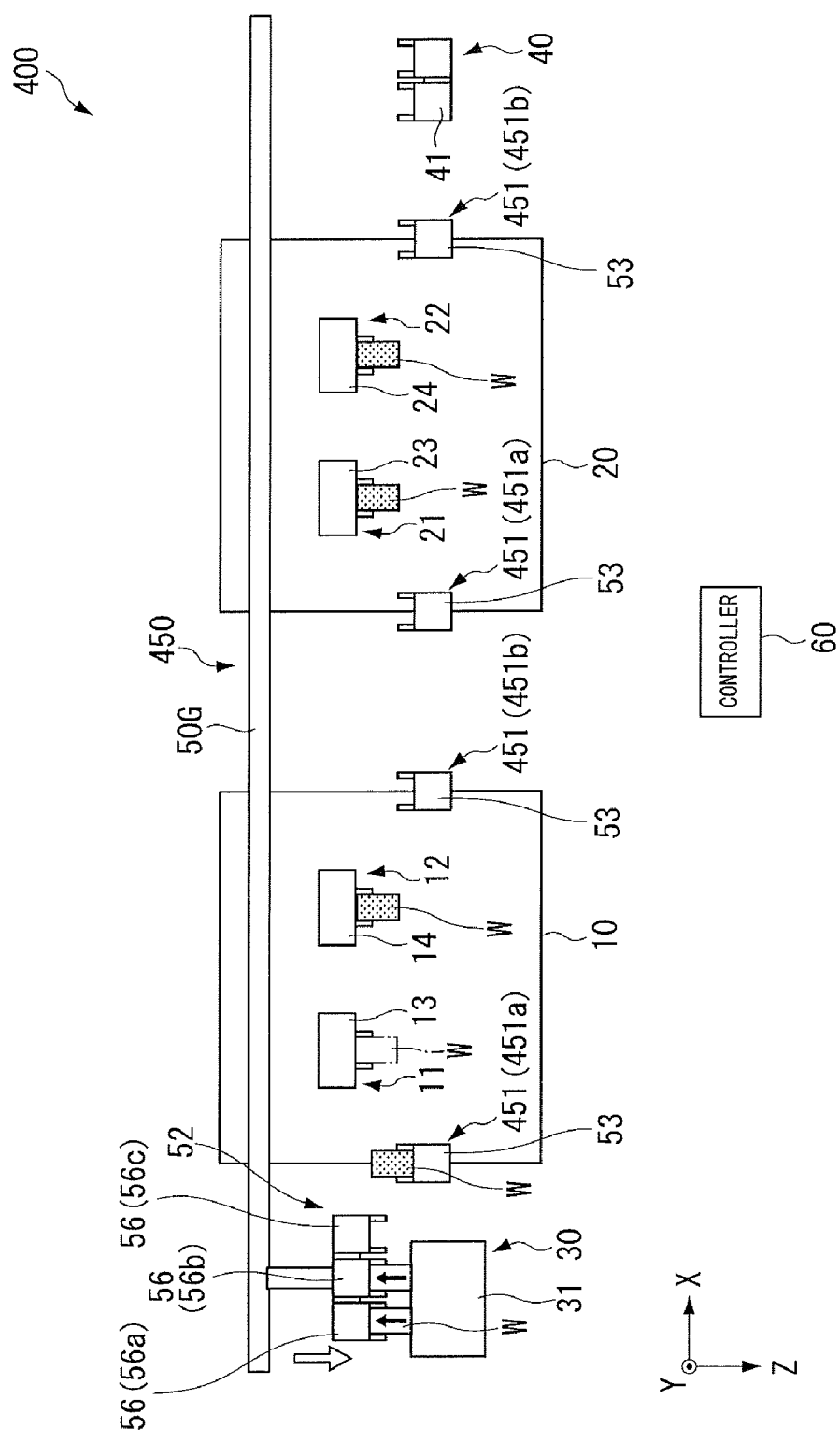
FIG. 26 is a diagram illustrating an example of an operation of the workpiece conveyance system, subsequently to FIG. 25.

As illustrated in FIG. 26, the controller 60 allows the main loader chucks 56 of the main loader 52 to receive two unmachined workpieces W placed on the carrying-in part 30. The receiving procedure of the workpieces W by each of the main loader chucks 56 is similar to that of the first configuration. The controller 60 allows the two main loader chucks 56a and 56b of the three main loader chucks 56 of the main loader 52 to simultaneously receive the unmachined workpieces W. Consequently, the main loader chuck 56c is in an empty state.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chuck 53 of a relay loader 451a corresponding to the spindle 11 of the first body 10. As in the first configuration, after or before the main loader chucks 56 are reached, in a state in which the relay loader chuck 53 of the relay loader 451a holds the machined workpiece W received from the spindle 11, the controller 60 disposes the relay loader chuck 53 at the second position P2. The controller 60 allows the relay loader chuck 53 of the relay loader 451a and the main loader chuck 56c in the empty state in the main loader 52 to face each other.

Figure 27:
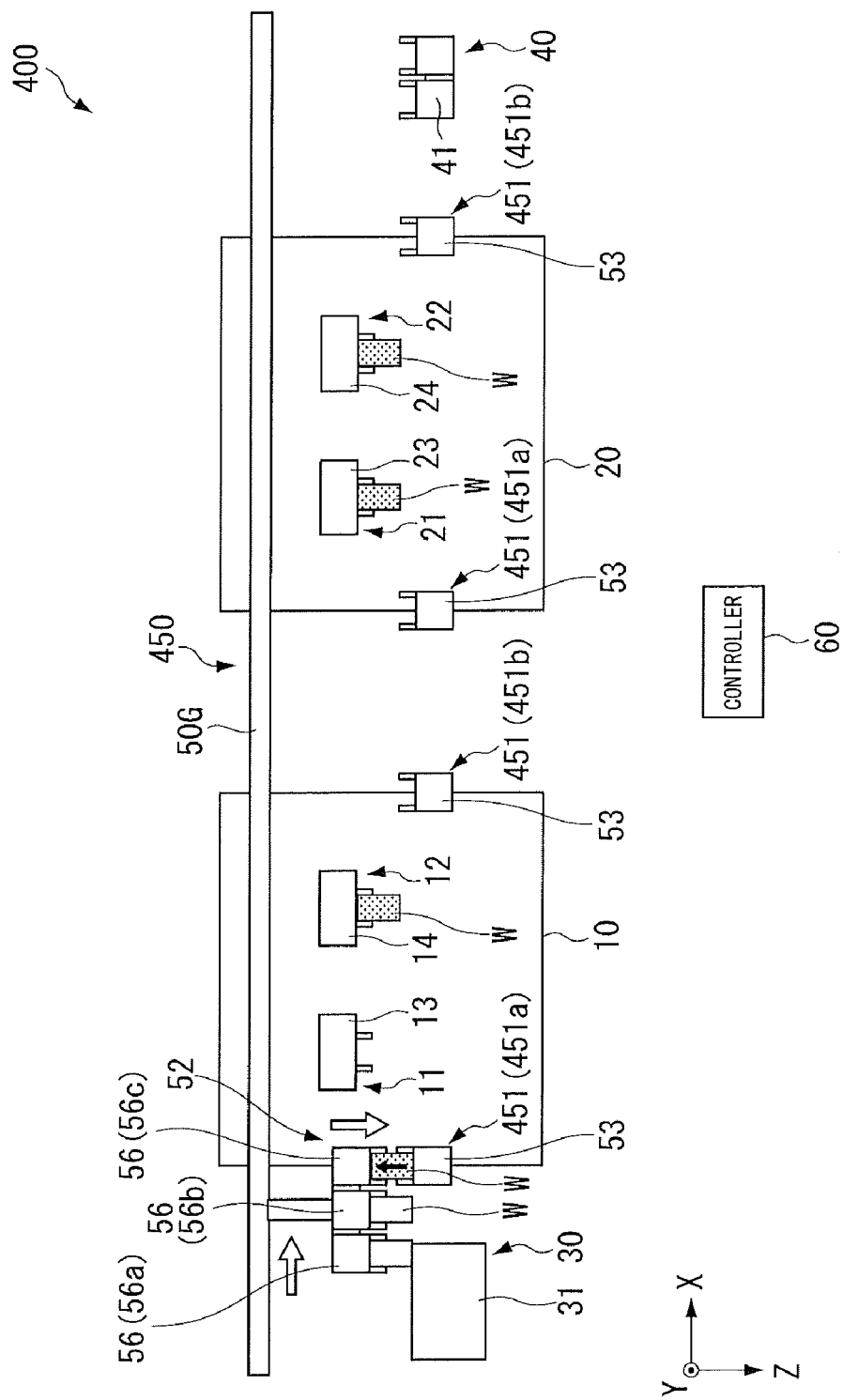
FIG. 27 is a diagram illustrating an example of an operation of the workpiece conveyance system, subsequently to FIG. 26.

Next, as illustrated in FIG. 27, the controller 60 moves the three main loader chucks 56 in the +Z direction to a position where the workpiece W can be received from and delivered to the relay loader chuck 53. Subsequently, the controller 60 closes the main loader chuck 56c to hold the machined workpiece W and then releases the relay loader chuck 53. As a consequence, the machined workpiece W is delivered from the relay loader chuck 53 to the main loader chuck 56c. Next, the controller 60 moves back the main loader chucks 56 in the −Z direction, then moves the main loader chucks 56 along the guide 50G in the +X direction, and allows the relay loader chuck 53 of a relay loader 451a and the main loader chuck 56b holding the unmachined workpiece W in the main loader 52 to face each other.

Figure 28:
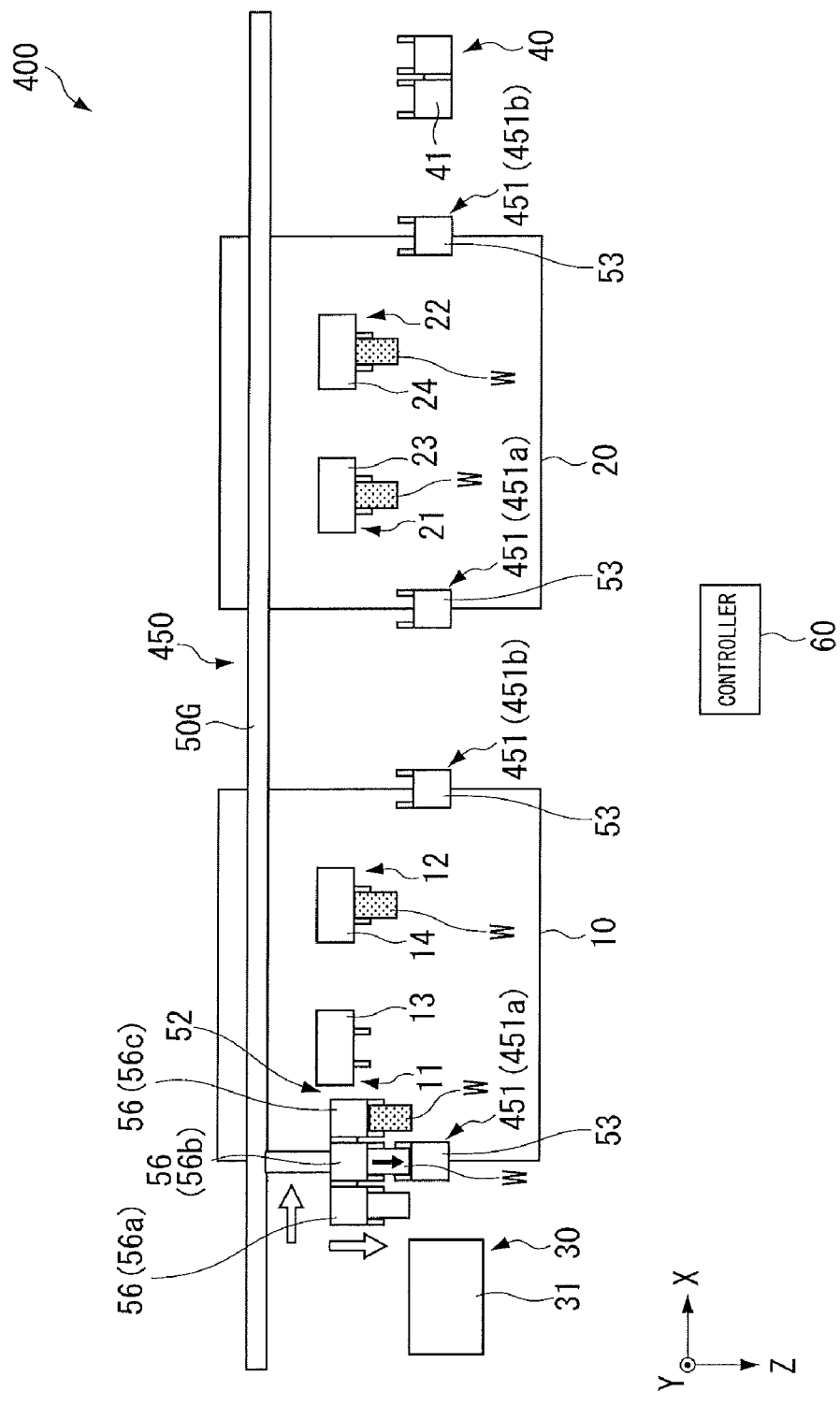
FIG. 28 is a diagram illustrating an example of an operation of the workpiece conveyance system, subsequently to FIG. 27.

Next, as illustrated in FIG. 28, the controller 60 moves the three main loader chucks 56 in the +Z direction to a position where the workpiece W can be received from and delivered to the relay loader chuck 53. Subsequently, the controller 60 closes the relay loader chuck 53 to hold the unmachined workpiece W and then releases the main loader chuck 56b. As a consequence, the unmachined workpiece W is delivered from the main loader chuck 56b to the relay loader chuck 53. With the aforementioned operation, in the main loader 52, the main loader chuck 56c holds the machined workpiece W, the main loader chuck 56b is in an empty state, and the main loader chuck 56a maintains the state of holding the unmachined workpiece W as is.

In addition, during the conveyance of the workpiece W by the main loader 52 and the receiving and delivery of the workpiece W from/to a next relay loader 451b, the controller 60 performs a series of controls to turn the turning plate 55 (see FIG. 5) of the relay loader 451a having received the unmachined workpiece W to the first position P1, to allow the spindle chuck 13 to receive an unmachined workpiece W held by the relay loader chuck 53 (see description of FIG. 29 to be described later), and to turn the turning plate 55 to the second position P2. In a manner similar to the receiving and delivery of the workpieces W between the relay loader chuck 53 and the spindle chuck 13, receiving and delivery of workpieces W between another relay loader chuck 53 and another main shaft chuck 14, or the like, can also be performed.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the relay loader chuck 53 of the relay loader 451b corresponding to the spindle 12 of the first body 10. In a manner similar to the first configuration, after or before the main loader chucks 56 are reached, in a state in which the relay loader chuck 53 of the relay loader 451b holds the machined workpiece W received from the spindle 12, the controller 60 disposes the relay loader chuck 53 at the second position P2. The controller 60 allows the relay loader chuck 53 holding the machined workpiece W in the relay loader 451b and the main loader chuck 56b in the empty state in the main loader 52 to face each other.

Figure 29:
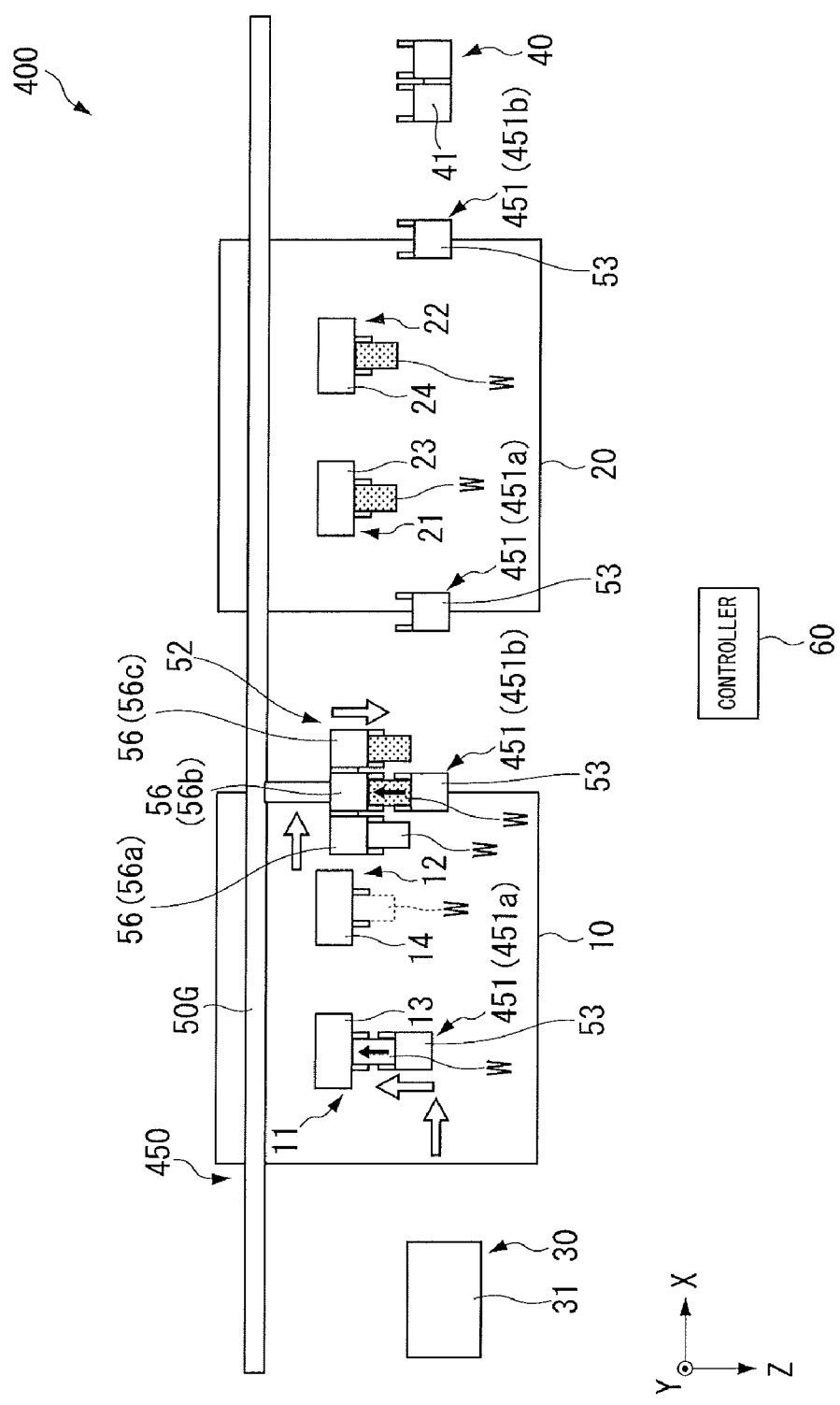
FIG. 29 is a diagram illustrating an example of an operation of the workpiece conveyance system, subsequently to FIG. 28.

Next, as illustrated in FIG. 29, the controller 60 moves the three main loader chucks 56 in the +Z direction to a position where the workpiece W can be received from and delivered to the relay loader chuck 53. Subsequently, the controller 60 closes the main loader chuck 56b to hold the machined workpiece W and then releases the relay loader chuck 53. As a consequence, the machined workpiece W is delivered from the relay loader chuck 53 to the main loader chuck 56b. Next, the controller 60 moves back the main loader chucks 56 in the −Z direction, moves the main loader chucks 56 along the guide 50G in the +X direction, and allows the relay loader chuck 53 of a relay loader 451b and the main loader chuck 56a holding the unmachined workpiece W in the main loader 52 to face each other.

Figure 30:
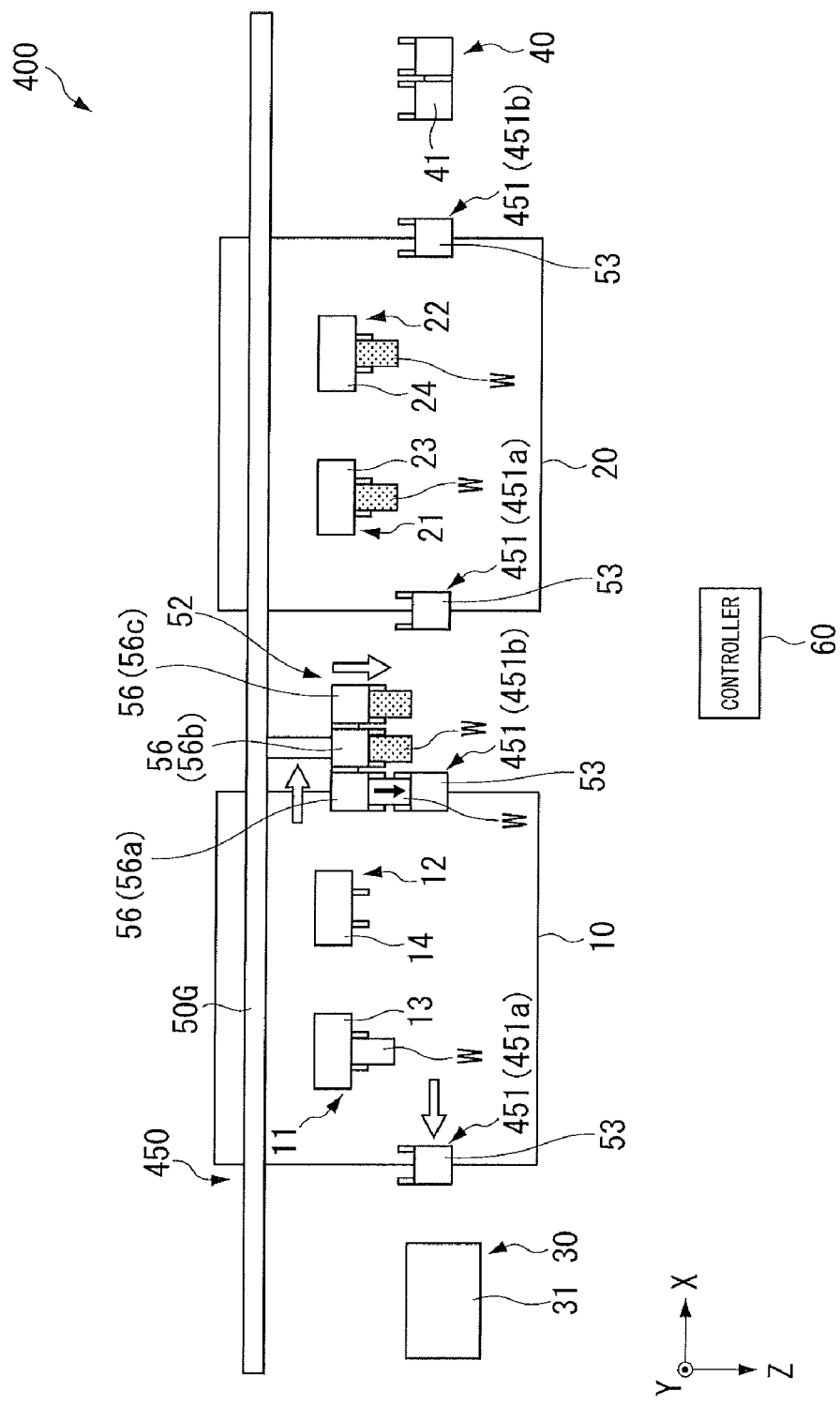
FIG. 30 is a diagram illustrating an example of an operation of the workpiece conveyance system, subsequently to FIG. 29.

Next, as illustrated in FIG. 30, the controller 60 moves the three main loader chucks 56 in the +Z direction to a position where the workpiece W can be received from and delivered to the relay loader chuck 53. Subsequently, the controller 60 closes the relay loader chuck 53 to hold the unmachined workpiece W and then releases the main loader chuck 56a. As a consequence, the unmachined workpiece W is delivered from the main loader chuck 56a to the relay loader chuck 53. With the aforementioned operation, in the main loader 52, the main loader chucks 56b and 56c hold the machined workpieces W and the main loader chuck 56a is in an empty state.

Next, the controller 60 moves back the main loader chucks 56 in the −Z direction, then moves the main loader chucks 56 along the guide 50G in the +X direction, and disposes the main loader chucks 56 at a position where the main loader chucks 56 can face the carrying-out chucks 41 of the carrying-out part 40.

Figure 31:
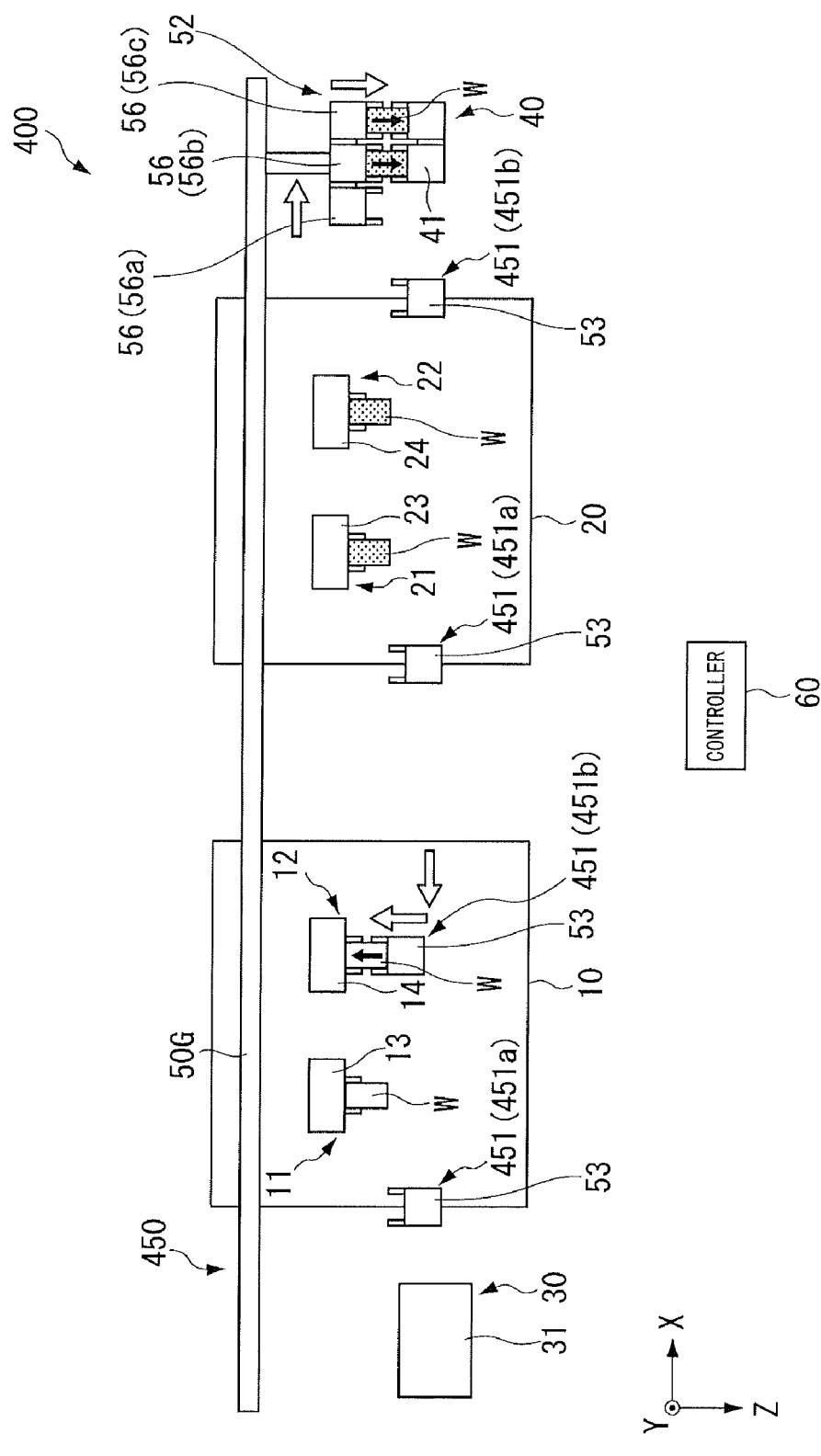
FIG. 31 is a diagram illustrating an example of an operation of the workpiece conveyance system, subsequently to FIG. 30.

Next, as illustrated in FIG. 31, the controller 60 moves the three main loader chucks 56 in the +Z direction to a position where the workpieces W can be received from and delivered to the carrying-out chucks 41. Subsequently, the controller 60 allows each carrying-out chuck 41 to hold the machined workpiece W and then releases the main loader chucks 56b and 56c. As a consequence, the two machined workpieces W are simultaneously or almost simultaneously delivered from the main loader chucks 56b and 56c to the carrying-out chucks 41, respectively. With such an operation, in the main loader 352, the three main loader chucks 56 are in an empty state, move along the guide 50G in the −X direction, and return to the carrying-in part 30 so that two unmachined workpieces W can be held by the main loader chucks 56 as illustrated in FIG. 26.

As described above, even though there is one relay loader chuck 53 in each relay loader 451a or the like, while the main loader 52 moves once in the +X direction from the carrying-in part 30 to the carrying-out part 40, the main loader 52 continuously receives and delivers workpieces W from/to the two spindle chucks 13 and 14 disposed in the first body 10.

Next, in a manner similar to the illustration in FIG. 26, the main loader chucks 56 hold two unmachined workpieces W on the carrying-in part 30, move along the guide 50G in the +X direction, receive a machined workpiece W from the relay loader chuck 53 of the relay loader 451a of the second body 20, and deliver the unmachined workpiece W. The receiving and delivery operation of the workpieces W is similar to the operations in FIGS. 27 and 28. Next, the main loader chucks 56 move along the guide 50G in the +X direction, receive a machined workpiece W from the relay loader chuck 53 of the relay loader 451b of the second body 20, and deliver the unmachined workpiece W. The receiving and delivery operation of the workpieces W is similar to operations in FIGS. 29 and 30. Next, the main loader chucks 56 move along the guide 50G in the +X direction and deliver the machined workpieces W to the carrying-out chucks 41 of the carrying-out part 40.

In the main loader 52, the main loader chucks 56 are in an empty state and return to the carrying-in part 30 so that the main loader chucks 56 can hold two unmachined workpieces W as illustrated in FIG. 26. Such an operation is repeated so that unmachined workpieces W are continuously supplied to the spindles 11 and 12 of the first body 10 and the spindles 21 and 22 of the second body 20 and machined workpieces W are continuously collected. In this example, the receiving and delivery operation of the workpieces W by the main loader chucks 56 is repeated twice (n=2) for the spindles 11 and 12 or the spindles 21 and 22, respectively.

As described above, according to this example, since unmachined workpieces W are supplied to the spindles 11 and 12 or the spindles 21 and 22, and machined workpieces W are collected, while the main loader 52 reaches the carrying-out part 40 from the carrying-in part 30, a time required to receive and deliver the workpieces W is shortened, and the efficiency in conveying the workpieces W can be improved. Furthermore, according to this example, since there is only one relay loader chuck 53 in each relay loader 451a or the like, it is possible to reduce the equipment cost by simplifying the configurations of the relay loader 451a or the like. In the aforementioned example, three (which is equal to the number of spindles 11 and 12 (n=2) plus one) main loader chucks 56 are used. However, four or more main loader chucks 56 may be used. Furthermore, as in the second configuration, five (=1+four spindles 11, 12, 21, and 22) main loader chucks 56 may also be used. The receiving and delivery operation of the workpieces W by the main loader chucks 56 may be repeated four times (n=4) for the spindle 11 or the like.

So far, although the configurations/examples have been described, this disclosure is not limited to the aforementioned description and various modifications can be made within the range without departing from the scope of this disclosure. For example, the components of the aforementioned each configuration may be appropriately combined. For example, the workpiece conveyance system may be configured by replacing a part of the relay loader 51 of the first configuration with the relay loader 451 of the fourth configuration. Furthermore, in the first and second configurations, the configuration in which the relay loader chucks 53 and the main loader chucks 56 are disposed at the same interval d has been described as an example. However, this disclosure is not limited to this configuration and the interval between the relay loader chucks 53 and the interval between the main loader chucks 56 may be different from each other.

Furthermore, in the aforementioned first, second, and fourth configurations, switching between the first position P1 and the second position P2 is performed by turning the turning plate 55 as the relay loaders 51 and 451. However, this disclosure is not limited to this configuration. For example, the relay loader chuck 53 may also be configured to be slidable in an up and down direction (Y direction) or the like as the relay loaders 51 and 451.

Furthermore, in the aforementioned examples, a lathe has been described as an example of the first body 10 and the second body 20 that are machine tool bodies. However, the machine tool body is not limited to the lathe. For example, a machining center or the like may be used as the machine tool body.

The contents of Japanese Patent Application No. 2017-078246 and all documents cited in this specification are incorporated herein by reference as a part of the description of the body.

The invention claimed is:

1. A workpiece conveyance system that receives and delivers workpieces to be machined from/to n workpiece holders (where n is an integer satisfying n≥2) that hold the workpieces, comprising:

a main loader including n+m main loader chucks, where m is an integer satisfying m≥1, that receive and deliver the workpieces from/to the n workpiece holders or n relay loaders disposed corresponding to the n respective workpiece holders to receive and deliver the workpieces from/to the workpiece holders, and a controller that, when the n main loader chucks hold unmachined workpieces and the m main loader chucks are in an empty state in relation to one of the n workpiece holders, allows the main loader chucks in the empty state to receive a machined workpiece from the one of the workpiece holders and allows the main loader chucks holding the unmachined workpieces to supply the unmachined workpiece to the one of the workpiece holders, and in relation to one of next workpiece holders, allows the main loader chucks previously in the empty state to receive a machined workpiece from the one of the next workpiece holders and allows the main loader chucks holding the unmachined workpieces to supply the unmachined workpiece to the one of the next workpiece holders, the controller receiving the machined workpiece and supplying the unmachined workpiece from/to the one of the workpiece holders repeatedly n times.

2. A workpiece conveyance system that receives and delivers workpieces to be machined from/to n workpiece holders (where n is an integer satisfying n≥2) that hold the workpieces, comprising a main loader including n+m main loader chucks, where m is an integer satisfying m≥1, that receive and deliver the workpieces from/to the n workpiece holders or n relay loaders disposed corresponding to the n respective workpiece holders to receive and deliver the workpieces from/to the workpiece holders, wherein the relay loaders each comprise a relay loader chuck that receives and delivers the workpiece from/to the corresponding workpiece holder, and in the main loader, the main loader chucks move to a position corresponding to the relay loader chuck and receives and delivers the workpiece from/to the relay loader chuck.

3. The workpiece conveyance system according to claim 2, wherein one of the relay loaders has disposed thereon a plurality of the relay loader chucks.

4. The workpiece conveyance system according to claim 3, wherein the n+m main loader chucks are disposed in one direction at a predetermined interval, the relay loader chucks are disposed at an interval equal to the interval between the main loader chucks, and the relay loader chucks are disposed in parallel with the one direction with movement of the relay loaders.

5. The workpiece conveyance system according to claim 4, comprising a controller that performs, in one operation, an operation of delivering the workpieces from the relay loader chucks to the main loader chucks and an operation of delivering the workpieces from the main loader chucks to the relay loader chucks.

6. The workpiece conveyance system according to claim 2, wherein the main loader is movable in a direction that is a horizontal direction and is orthogonal to a direction of a rotation axis of the workpiece holders, and the relay loaders are able to turn in a direction around an axis parallel with the rotation axis of the workpiece holders, and turn between a first position where the relay loader chucks face the workpiece holders and a second position where the relay loader chucks are able to face the n+m main loader chucks.

7. The workpiece conveyance system according to claim 2, wherein the relay loader chucks and the main loader chucks hold the workpieces toward a direction parallel with the rotation axis of the workpiece holders.

8. A machine tool system comprising:

a machine tool body including a plurality of workpiece holders that hold and rotate workpieces to be machined;

a carrying-in part that holds an unmachined workpiece;

a carrying-out part that holds a machined workpiece; and a workpiece conveyance system comprising a main loader including n+m main loader chucks, where m is an integer satisfying m≥1, that receive and deliver the workpieces from/to the n workpiece holders or n relay loaders disposed corresponding to the n respective workpiece holders to receive and deliver the workpieces from/to the workpiece holders, wherein the workpiece conveyance system:

receives and delivers workpieces to be machined from/to n workpiece holders (where n is an integer satisfying n≥2) that hold the workpieces, and conveys a workpiece between the workpiece holders and the carrying-in part, or between the workpiece holders and the carrying-out part, or both.

9. The workpiece conveyance system according to claim 1, wherein the relay loaders each comprise a relay loader chuck that receives and delivers the workpiece from/to the corresponding workpiece holder, and in the main loader, the main loader chucks move to a position corresponding to the relay loader chuck and receives and delivers the workpiece from/to the relay loader chuck.

10. The workpiece conveyance system according to claim 3, wherein the main loader is movable in a direction that is a horizontal direction and is orthogonal to a direction of a rotation axis of the workpiece holders, and the relay loaders are able to turn in a direction around an axis parallel with the rotation axis of the workpiece holders, and turn between a first position where the relay loader chucks face the workpiece holders and a second position where the relay loader chucks are able to face the n+m main loader chucks.

11. The workpiece conveyance system according to claim 4, wherein the main loader is movable in a direction that is a horizontal direction and is orthogonal to a direction of a rotation axis of the workpiece holders, and the relay loaders are able to turn in a direction around an axis parallel with the rotation axis of the workpiece holders, and turn between a first position where the relay loader chucks face the workpiece holders and a second position where the relay loader chucks are able to face the n+m main loader chucks.

12. The workpiece conveyance system according to claim 5, wherein the main loader is movable in a direction that is a horizontal direction and is orthogonal to a direction of a rotation axis of the workpiece holders, and the relay loaders are able to turn in a direction around an axis parallel with the rotation axis of the workpiece holders, and turn between a first position where the relay loader chucks face the workpiece holders and a second position where the relay loader chucks are able to face the n+m main loader chucks.

13. The workpiece conveyance system according to claim 3, wherein the relay loader chucks and the main loader chucks hold the workpieces toward a direction parallel with the rotation axis of the workpiece holders.

14. The workpiece conveyance system according to claim 4, wherein the relay loader chucks and the main loader chucks hold the workpieces toward a direction parallel with the rotation axis of the workpiece holders.

15. The workpiece conveyance system according to claim 5, wherein the relay loader chucks and the main loader chucks hold the workpieces toward a direction parallel with the rotation axis of the workpiece holders.

16. The workpiece conveyance system according to claim 6, wherein the relay loader chucks and the main loader chucks hold the workpieces toward a direction parallel with the rotation axis of the workpiece holders.

17. The workpiece conveyance system according to claim 1, wherein the main loader chucks are switched between a state of holding a workpiece toward a direction parallel with the rotation axis of the corresponding workpiece holder and a state of holding a workpiece in a downward direction.

18. The workpiece conveyance system according to claim 2, wherein the main loader chucks are switched between a state of holding a workpiece toward a direction parallel with the rotation axis of the corresponding workpiece holder and a state of holding a workpiece in a downward direction.

\* \* \* \* \*